United States Patent
Yamaguchi et al.

(10) Patent No.: US 8,154,472 B2
(45) Date of Patent: *Apr. 10, 2012

(54) DISPLAY SYSTEM, DISPLAY METHOD, AND DISPLAY PROGRAM

(75) Inventors: Hiroshi Yamaguchi, Kanagawa (JP); Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1325 days.

This patent is subject to a terminal disclaimer.

(21) Appl. No.: 11/802,881

(22) Filed: May 25, 2007

(65) Prior Publication Data
US 2007/0273609 A1 Nov. 29, 2007

(30) Foreign Application Priority Data

May 25, 2006 (JP) ................................. 2006-145936
May 10, 2007 (JP) ................................. 2007-125984

(51) Int. Cl.
*G09G 5/00* (2006.01)
(52) U.S. Cl. .......................................... 345/1.1; 345/1.3
(58) Field of Classification Search ............. 345/1.1–1.3
See application file for complete search history.

(56) References Cited

U.S. PATENT DOCUMENTS

| | | | | |
|---|---|---|---|---|
| 3,596,389 | A * | 8/1971 | Drueck, Jr. ...................... | 40/476 |
| 5,252,950 | A * | 10/1993 | Saunders et al. .................. | 345/9 |
| 5,274,363 | A * | 12/1993 | Koved et al. ..................... | 345/2.1 |
| 5,714,972 | A * | 2/1998 | Tanaka et al. ................... | 345/156 |
| 5,815,411 | A * | 9/1998 | Ellenby et al. .................. | 702/150 |
| 5,959,605 | A * | 9/1999 | Gilblom ......................... | 345/671 |
| 6,072,476 | A * | 6/2000 | Harada et al. .................. | 345/204 |
| 6,121,966 | A * | 9/2000 | Teodosio et al. ............... | 715/838 |
| 6,288,704 | B1 * | 9/2001 | Flack et al. .................... | 345/158 |
| 6,340,957 | B1 * | 1/2002 | Adler et al. .................... | 345/1.3 |
| 6,788,293 | B1 * | 9/2004 | Silverbrook et al. .......... | 345/173 |
| 6,950,116 | B2 * | 9/2005 | Ternullo ........................ | 715/747 |
| 7,071,990 | B2 * | 7/2006 | Kondo .......................... | 348/383 |
| 7,321,342 | B2 * | 1/2008 | Nagae ............................. | 345/2.1 |
| 2002/0158921 | A1 * | 10/2002 | Silverstein ..................... | 345/864 |
| 2002/0180767 | A1 * | 12/2002 | Northway et al. ............. | 345/698 |
| 2003/0098845 | A1 * | 5/2003 | Hanson et al. ................. | 345/156 |

(Continued)

FOREIGN PATENT DOCUMENTS
JP 2006-30563 A 2/2006

*Primary Examiner* — Richard Hjerpe
*Assistant Examiner* — Dorothy Harris
(74) *Attorney, Agent, or Firm* — Birch, Stewart, Kolasch & Birch, LLP

(57) ABSTRACT

Enlarged display of part of display data on display by a first display section is performed to a second display section, based on a relative position of the second display section with respect to the first display section. A display system has a first display section that displays display data; a second display section that performs enlarged display of part of the display data on display by the first display section; a display partial area storage section that stores an area of the partial data to be displayed to the second display section that is part of the display data on display by the first display section; a relative position determination section that determines a relative positional relation between the first display section and the second display section; and a display control section that performs enlarged display of at least part of the partial data of the area stored in the display partial area storage section in association with the positional relation information indicating the relative positional relation determined by the relative position determination section, to the second display section.

6 Claims, 20 Drawing Sheets

U.S. PATENT DOCUMENTS

| | | | |
|---|---|---|---|
| 2005/0040753 A1* | 2/2005 | Osame et al. | 313/500 |
| 2005/0093466 A1* | 5/2005 | Matsumoto | 315/169.3 |
| 2005/0168399 A1* | 8/2005 | Palmquist | 345/1.1 |
| 2006/0109197 A1* | 5/2006 | Kuwabara et al. | 345/1.1 |
| 2007/0085759 A1* | 4/2007 | Lee et al. | 345/1.1 |
| 2007/0103652 A1* | 5/2007 | Nijim et al. | 353/94 |
| 2007/0191070 A1* | 8/2007 | Rao | 455/566 |
| 2008/0055271 A1* | 3/2008 | Yamaguchi et al. | 345/173 |
| 2010/0321275 A1* | 12/2010 | Hinckley et al. | 345/1.3 |

\* cited by examiner

DISPLAY SYSTEM, DISPLAY METHOD, AND DISPLAY PROGRAM

CROSS REFERENCE TO RELATED APPLICATION

The present application claims priority from Japanese Patent Application No. 2006-145936 filed on May 25, 2006, and Japanese Patent Application No. 2007-125984 filed on May 10, 2007, the contents of which are incorporated herein by reference.

BACKGROUND

1. Field of the Invention

The present invention relates to a display system, a display method, and a display program. In particular, the present invention relates to a display system, a display method, and a display program for displaying, to the second display section, partial data of or adjacent document data of display data on display by the first display section, or for displaying, to the third display section, partial data of or adjacent data of display data on display by either the first display section or the second display section.

2. Related Art

An image browsing system has already been disclosed by which, when the first electronic paper detects that the second electronic paper is placed adjacent to the first electronic paper, a partial image that is adjacent to a partial image on display by the first electronic paper is displayed to the second electronic paper (e.g. Patent Document 1). To be specific, if the second electronic paper being blank is placed adjacent to the first electronic paper while a predetermined map is displayed in the first electronic paper, a map that is a continuation of the first electronic paper is displayed in the second electronic paper.

[Patent Document 1] Japanese Patent Application Publication No. 2006-30563

However, in the invention of the patent document 1, it is required that a predetermined side of the first electronic paper is placed opposed to a predetermined side of the second electronic paper. Consequently, depending on the orientation of the second electronic paper with respect to the first electronic paper, it is not possible to display to the second electronic paper an image that a user desires. Additionally, when the second electronic paper is overlapped to the first electronic paper, it is not possible to display an image that a user desires, to the second electronic paper either. Furthermore in the invention of the patent document 1, data to be displayed to the first electronic paper or to the second electronic paper is limited to image data, and there is no disclosure about an occasion when the third electronic paper is placed.

In view of this, the present invention aims to provide a display system, a display method, and a display program that are able to solve the foregoing problems. This purpose is achieved by combinations of features described in the independent claims. The dependent claims define further advantageous and concrete examples of the present invention.

SUMMARY

So as to solve the foregoing problems, according to the first aspect of the present invention, there is provided a display system including: a first display section that displays display data; a second display section that displays partial data of the display data or adjacent document data adjacent to the display data; a position determination section that determines a positional relation between the first display section and the second display section; and a display control section that causes the partial data or the adjacent document data to be displayed to the second display section, according to the positional relation determined by the position determination section.

According to the second aspect of the present invention, there is provide a display system including: a first display section that displays first display data; a second display section that displays second display data that is either partial data of the first display data or adjacent data adjacent to the first display data; a third display section that displays third display data; a position determination section that determines a relative positional relation among the first display section, the second display section, and the third display section; and a display control section that causes partial data of the second display data or adjacent data adjacent to the second display data to be displayed to the third display section as the third display data, according to the positional relation among the first display section, the second display section, and the third display section determined by the position determination section.

According to another aspect of the present invention, there is provided a display system having: a first display section that displays display data; a second display section that performs enlarged display of part of the display data on display by the first display section; a display partial area storage section that stores an area of the partial data to be displayed to the second display section that is part of the display data on display by the first display section; a relative position determination section that determines a relative positional relation between the first display section and the second display section; and a display control section that performs enlarged display of at least part of the partial data of the area stored in the display partial area storage section in association with the positional relation information indicating the relative positional relation determined by the relative position determination section, to the second display section.

It is also possible to arrange so that the display partial area storage section stores an area of partial data of the display data on display by the first display section to which the second display section overlaps, and when the relative position determination section has determined that the first display section and the second display section overlap in the display direction, the display control section performs enlarged display, to the second display section, of at least part of the area of the partial data of the display data on display by the first display section to which the second display section overlaps, which is stored by the display partial area storage section in association with the positional relation information indicating that the first display section and the second display section overlap in the display direction.

It is also possible to arrange so that, if the second display section is moved by being overlapped to the first display section, from a position at which the second display section is overlapped to the upper edge of the display data on display by the first display section to a position at which the second display section overlaps to the lower edge of the display data on display by the first display section, the display control section displays, to the second display section, the display data on display by the first display section from the upper edge to the lower edge by sequentially enlarging the same, from when the second display section is overlapped to the upper edge of the display data on display by the first display section to when the second display section is overlapped to the lower edge of the display data on display by the first display section.

It is also possible to provide: a plurality of signal transmission sections that are placed in predetermined positions of the second display section and transmit identification signals at respectively different frequencies; a plurality of signal reception sections that are placed in predetermined positions of the first display section and respectively receive the plurality of identification signals transmitted from the plurality of signal transmission sections at the respectively different frequencies; and a signal strength calculation section that respectively calculates reception strengths of the plurality of identification signals respectively received by the plurality of signal reception sections are provided, where the relative position determination section determines the relative positional relation between the first display section and the second display section from the reception strengths of the plurality of identification signals calculated by the signal strength calculation section respectively for the plurality of identification signals received respectively by the plurality of signal reception sections. In addition, it is also possible to further provide a plurality of light quantity detection sections that are placed in the first display section at a predetermined interval and detect the quantity of light irradiated onto the first display section, where the relative position determination section may determine the relative positional relation between the first display section and the second display section from a position, with respect to the first display section, of the plurality of light quantity detection sections having detected a predetermined light quantity or more. Further, it is also possible to further provide a position identifying section that identifies positions of the first display section and the second display section, where the relative position determination section determines the relative positional relation between the first display section and the second display section from the positions of the first display section and of the second display section identified by the position identifying section.

It is also possible to arrange so that the display partial area storage section stores, in association with positional relation information indicating a range in which both of the first display section and the second display section exist in the first direction that is along a predetermined side of the first display section, the area of the partial data in the range in the first direction that is part of the display data on display by the first display section, and when the relative position determination section has judged that both of the first display section and the second display section exist in the predetermined range in the first direction, the display control section performs, to the second display section, enlarged display of at least part of the area of the partial data in the predetermined range in the first direction that is part of the display data on display by the first display section, which has been stored by the display partial area storage section in association with the positional relation information indicating the range.

It is also possible to arrange so that, when the predetermined range in which both of the first display section and the second display section exist in the first direction is moved from a position corresponding to an upper edge of the display data on display by the first display section to a position corresponding to a lower edge of the display data on display by the first display section, the display control section displays, to the second display section, the display data on display by the first display section the upper edge to the lower edge by sequentially enlarging the same, from when the predetermined range is overlapped to the position corresponding to the upper edge of the display data on display by the first display section to when the predetermined range is overlapped to the position corresponding to the lower edge of the display data on display by the first display section.

According to a different aspect of the present invention, there is provide a display method having: a first display step of displaying display data to a first display section; a relative position determination step of determining a relative positional relation between the first display section and a second display section that performs enlarged display of part of the display data on display by the first display section; a display partial area extraction step of extracting, from a display partial area storage section storing the area of the partial data to be displayed to the second display section that is part of the display data on display by the first display section, the area of the partial data that is in association with the positional relation information indicating the relative position information determined in the relative position determination step, in association with the positional relation information indicating the relative positional relation between the first display section and the second display section; and a second display step of performing enlarged display of at least part of the partial data of the area extracted in the display partial area extraction step, to the second display section.

According to a still different aspect of the present invention, there is provided a display program for a display system that performs, to the second display section, enlarged display of part of the display data on display by a first display section, the display program causing the display system to function as: a display partial area storage section that stores the area of the partial data to be displayed to the second display section that is part of the display data on display by the first display section; a relative position determination section that determines a relative relation between the first display section and the second display section; and a display control section that performs, to the second display section, enlarged display of at least part of the partial data of the area stored in the display partial area storage section in association with the relative position determined by the relative position determination section.

The summary of the invention does not necessarily describe all necessary features of the present invention. The present invention may also be a sub-combination of the features described above.

According to an aspect of the present invention, it becomes possible to perform, to the second display section, enlarged display of part of display data on display by the first display section, based on a relative position of the second display section relative to the first display section. Additionally, according to an aspect of the present invention, it becomes possible to display either partial data of display data on display by the first display section or adjacent document data that is adjacent to the display data, depending on the positional relation between the first display section and the second display section. Furthermore, according to an aspect of the present invention, it becomes possible to display to the third display section, partial data either of the first display data on display by the first display section or of the second display data on display by the second display section, or adjacent data that is adjacent to either the first display data or the second display data, as third display data, depending on the positional relation among the first display section, the second display section, and the third display section.

DESCRIPTION OF EXEMPLARY EMBODIMENTS

As follows, the present invention is described according to preferred embodiments, which do not limit the scope of the present invention regarding the appended claims. Not all of the features described in the embodiments and the combinations thereof are necessarily essential to the means for solving the present invention.

Figure 1:
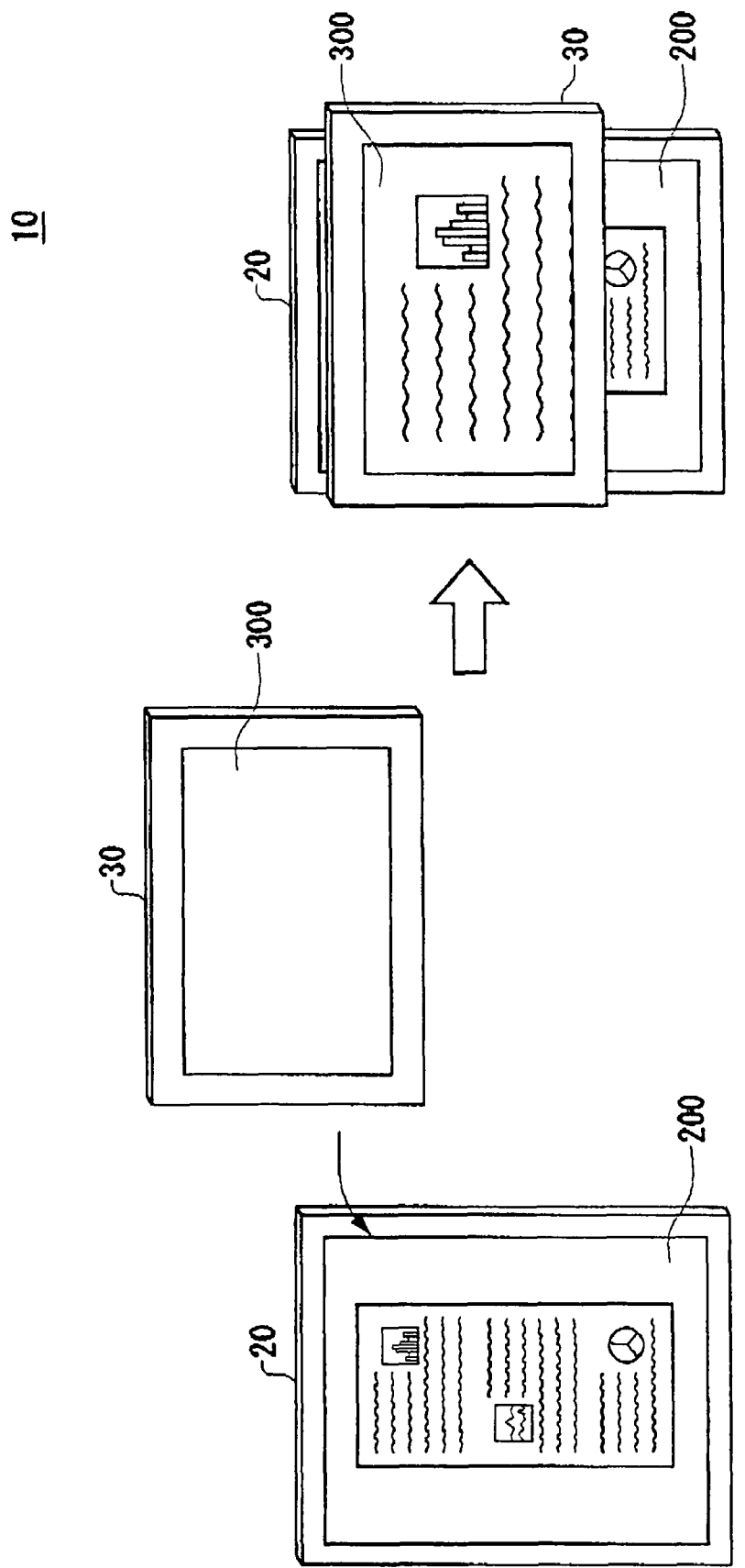
FIG. 1 shows a brief overview of a display system 10.

FIG. 1 shows a brief overview of a display system 10 according to one embodiment of the present invention. The display system 10 includes a first display apparatus 20 and a second display apparatus 30. The display system 10 according to the present embodiment aims to perform, to a second display section 300, enlarged display of a part of the display data on display by a first display section 200, based on the relative position of the second display section 300 included in the second display apparatus 30 relative to the first display section 200 included in the first display apparatus 20.

First, the first display apparatus 20 reduces the display size of the display data, and displays the entirety of the display data to the first display section 200. For example, the first display apparatus 20 displays the entirety of the display data of a plurality of pages to the first display section 200. Here, the display data may be document data, image data, and data of weblog which is disclosed on the Internet and so on for example. When a user overlaps the second display apparatus 30 on the first display apparatus 20, a part of the display data on display by the first display section 200 of the first display apparatus 20 is enlarged to be displayed in the second display section 300, depending on the relative position of the first display section 200 and the second display section 300.

For example, the first display apparatus 20 and the second display apparatus 30 are overlapped, and the first display apparatus 20 is moved by keeping a state in which the second display apparatus 30 is overlapped to the first display apparatus 20. In this case, the first display apparatus 20 extracts partial data that is at least a part of the display data corresponding to the overlapped portion between the first display section 200 and the second display section 300 from among the display data on display by the first display section 200. Then the first display apparatus 20 sequentially enlarges the extracted partial data up to the size of the display area of the second display section 300, and displays the result to the second display section 300.

In the display system 10 according to the present embodiment, by performing the moving by keeping a state in which the second display apparatus 30 is overlapped to the first display apparatus 20, it becomes possible to perform enlarged display of part of the display data displayed in the first display section 200 in the reduced size, to the second display section 300. As a consequence, a user is able to perform enlarged display of only a part of the display data that the user desires to the second display apparatus 30 while grasping the entire image of the display data in the first display apparatus 20 at the same time.

Figure 2:
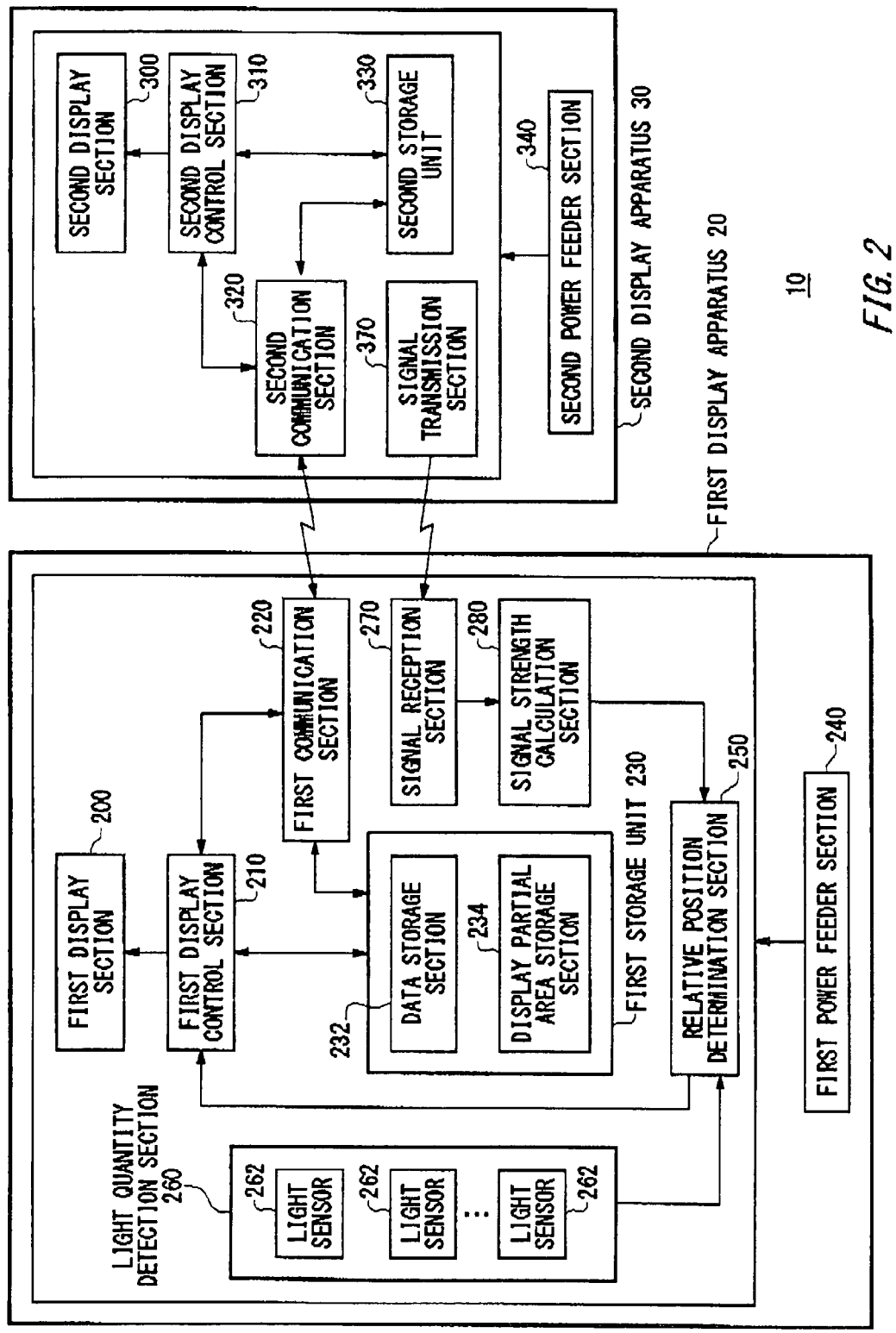
FIG. 2 shows a block diagram showing a functional configuration of the display system 10.

FIG. 2 shows one example of a functional configuration of the display system 10 according to the present embodiment. The display system 10 includes the first display apparatus 20 and the second display apparatus 30. The first display apparatus 20 includes a first display section 200, a first display control section 210, a first communication section 220, a first storage unit 230, a first power feeder section 240, a relative position determination section 250, a light quantity detection section 260, a plurality of signal reception sections 270, and a signal strength calculation section 280. Moreover, the first storage unit 230 includes a data storage section 232 and a display partial area storage section 234. Furthermore, the light quantity detection section 260 includes a plurality of light sensors 262. On the other hand, the second display apparatus 30 includes a second display section 300, a second display control section 310, a second communication section 320, a second storage unit 330, a second power feeder section 340, and a plurality of signal transmission sections 370. It should be noted here that the first display control section 210 is one example of the display control section set forth in the claims.

The first power feeder section 240 supplies power to each member of the first display apparatus 20, except for the first power feeder section 240. The first power feeder section 240 may be a battery for example. In addition, the second power feeder section 340 supplies power to each member of the second display apparatus 30, except for the second power feeder section 340. The second power feeder section 340 may also be a battery. Further, when the display system 10 is further equipped with a power supply apparatus for supplying power to the first display apparatus 20 and the second display apparatus 30 by generating a magnetic field in a predetermined range, the first power feeder section 240 and the second power feeder section 340 may receive power from the magnetic field that the power supply apparatus has generated. Then the first power feeder section 240 and the second power feeder section 340 may supply power received from the power supply apparatus, to each member of the first display apparatus 20 except for the first power feeder section 240 and to each member of the second display apparatus 30 except for the second power feeder section 340.

The power supply apparatus may include a plurality of power supply sections and a power supply control section. Each power supply section generates a magnetic field in a predetermined range. The plurality of power supply sections may be arranged with predetermined intervals therebetween. The power supply sections supply power to the first power feeder section 240 and the second power feeder section 340, in a state not directly contacted to the first power feeder section 240 of the first display apparatus 20 or to the second power feeder section 340 of the second display apparatus 30. Additionally, the power supply control section controls power supply from the power supply sections to the first power feeder section 240 and the second power feeder section 340. For example, the power supply control section may control the power supply quantity from the power supply sections to the first power feeder section 240 and the second power feeder section 340, by changing the state of the magnetic field.

Moreover, the power supply control section may monitor the state of the magnetic field generated by the power supply sections. The state of the magnetic field generated by the power supply sections changes if either the first power feeder section 240 or the second power feeder section 340 exists in a predetermined range from the position of the power supply sections. Accordingly, by detecting that the state of the magnetic field generated by the power supply sections has changed, the power supply control section is able to determine that either the first power feeder section 240 or the second power feeder section 340 exists in a predetermined range from the position of the power supply sections. In addition, when having detected that the state of the magnetic field generated by the power supply sections has changed, the power supply control section may feed power to the first power feeder section 240 of the first display apparatus 20 and to the second power feeder section 340 of the second display apparatus 30. It should be noted here that the first power feeder section 240 and the second power feeder section 340 may receive power from magnetic fields that the power supply sections have generated in respective different transmission frequencies. In other words, the power supply sections may, by being controlled by the power supply control section, generate a magnetic field of a transmission frequency for the first power feeder section 240 and a magnetic field of a transmission frequency for the second power feeder section 340.

The first display section 200 displays display data by being controlled by the first display control section 210. Moreover, the second display section 300 performs enlarged display of at least part of the display data on display by the first display section 200, by being controlled by the second display control section 310. The first storage unit 230 stores predetermined information. Concretely, the data storage section 232 included in the first storage unit 230 stores therein display data to be displayed to the first display section 200. The data storage section 232 supplies the display data in storage to the first display control section 210, by being controlled by the first display control section 210. In addition, the data storage section 232 may receive the display data to be stored therein, from the first communication section 220.

It should be noted here that the second storage unit 330 may temporarily store predetermined information received by the second communication section 320 from the first communication section 220. Examples of the predetermined information include a second display apparatus identifier identifying the second display apparatus 30, partial data on display by the second display section 300, and so on. The second storage unit 330 may supply the predetermined information in storage to the second display control section 310 by being controlled by the second display control section 310. Furthermore, the second storage unit 330 may supply the predetermined information in storage to the second communication section 320 by being controlled by the second communication section 320.

Furthermore, the display partial area storage section 234 included in the first storage unit 230 stores an area of partial data to be displayed to the second display section 300 that is part of the display data on display in the first display section 200, in association with positional relation information indicating the relative positional relation between the first display section 200 and the second display section 300. To be more specific, the display partial area storage section 234 stores an area of partial data that is a part of the display data on display by the first display section 200 that is overlapped with the second display section 300, in association with the positional relation information indicating that the first display section 200 and the second display section 300 are overlapping each other in the display direction. For example, when the first display section 200 and the second display section 300 are overlapping each other in the display direction, the display partial area storage section 234 stores coordinate data identifying the area of the partial data that is a part of the display data on display by the first display section 200 that is overlapped with the second display section 300, in association with coordinate data specifying the relative position of the second display section 300 relative to the first display section 200.

Additionally, in association with positional relation information indicating a range in which both of the first display section 200 and the second display section 300 exist in the first direction along a predetermined side of the first display section 200, the display partial area storage section 234 may store an area of partial data of the display data on display by the first display section 200 in the above-described range in the first direction. For example, with respect to the first display section 200, the second display section 300 may be placed in the second direction that is substantially perpendicular to the first direction along a predetermined side of the first display section 200. In association with the coordinate data specifying the range in which both of the first display section 200 and the second display section 300 exist in the first direction in this case, the display partial area storage section 234 stores coordinate data identifying the area of the partial data of the display data on display by the first display section 200 in the above-described range in the first direction. The display partial area storage section 234 supplies the area of the partial data to the first display control section 210 by being controlled by the first display control section 210.

The light quantity detection section 260 is placed in the first display section 200 with a predetermined interval, and detects the quantity of light irradiated onto the first display apparatus 20. Moreover, the light quantity detection section 260 includes a plurality of light sensors 262. The plurality of light sensors 262 may be placed with a predetermined interval in the vicinities of a respective plurality of sides of the first display section 200. It should be noted here that in the case that the first power feeder section 240 has received power, the light quantity detection section 260 may detect the quantity of light with use of the received power. The plurality of light sensors 262 supply detected quantity of light respectively to the relative position determination section 250, in association with respective positions of the plurality of light sensors 262 having detected the quantity of light relative to the first display section 200.

The plurality of signal transmission sections 370 included in the second display apparatus 30 are placed in predetermined positions of the second display section 300, and transmit identification signals at respectively different frequencies. For example, the plurality of signal transmission sections 370 may be placed in the vicinities respectively of the four corners of the second display section 300. Then, the plurality of signal transmission sections 370 transmit identification signals respectively to the signal reception section 270, with use of the predetermined frequencies respectively set thereto. It should be noted here that the plurality of signal transmission sections 370 may respectively transmit identification signals with use of substantially the same radio field strength.

A plurality of signal reception sections 270 included in the first display apparatus 20 are placed in predetermined positions of the first display section 200, and respectively receive the plurality of identification signals respectively transmitted from the plurality of signal transmission sections 370 in respectively different frequencies. For example, the plurality of signal reception sections 270 may be placed in the vicinities respectively of the four corners of the first display section 200. The plurality of signal reception sections 270 supply the plurality of identification signals respectively received thereby, to the signal strength calculation section 280. The signal strength calculation section 280 calculates respective reception strengths of the plurality of identification signals respectively received by the plurality of signal reception sections 270. The signal strength calculation section 280 supplies the calculated reception strengths of the plurality of identification signals, respectively to the relative position determination section 250.

The relative position determination section 250 determines a relative positional relation between the first display section 200 and the second display section 300. More specifically, the relative position determination section 250 determines the relative positional relation between the first display section 200 and the second display section 300, by using the reception strengths of the plurality of identification signals respectively calculated by the signal strength calculation section 280 where the plurality of identification signals have been respectively received by the plurality of signal reception sections 270. For example, the relative position determination section 250 estimates distances from the plurality of the signal transmission sections 370 to the plurality of signal reception sections 270 respectively, by using the reception strengths of the plurality of identification signals have been calculated by the signal strength calculation section 280. Then, the relative position determination section 250 may determine the relative positional relation between the first display section 200 and the second display section 300, from the plurality of distances calculated by the relative position determination section 250 respectively. For example, the relative position determination section 250 may calculate the relative position between the first display section 200 and the second display section 300, as coordinate data specifying the area in which the second display section 300 occupies with respect to the coordinate axis whose origin point is set as a predetermined position of the first display section 200.

Further, the relative position determination section 250 may determine the relative positional relation between the first display section 200 and the second display section 300, from a position, relative to the first display section 200, of the plurality of light sensors 262 having detected a predetermined quantity of light or above. For example, the quantity of light detected by light sensors 262 existing in an area where the second display section 300 overlaps to the first display section 200 is smaller than the quantity of light detected by light sensors 262 existing in an area where there is no overlap between the second display section 300 and the first display section 200. Consequently, the relative position determination section 250 is able to determine in which area on the first display section 200 the second display section 300 is overlapped, from respective positions of the plurality of light sensors 262 relative to the first display section 200, which have been associated with the quantity of light respectively received from the plurality of light sensors 262. Then, when having determined in which area on the first display section 200 the second display section 300 is overlapped, the relative position determination section 250 may calculate the relative position between the first display section 200 and the second display section 300, as coordinate data specifying the area in which the second display section 300 occupies with respect to the coordinate axis whose origin point is set as a predetermined position of the first display section 200. The relative position determination section 250 supplies positional relation information that specifies the determined relative positional relation between the first display section 200 and the second display section 300, to the first display control section 210.

The first communication section 220 transmits and receives predetermined information to/from the second communication section 320. The second communication section 320 transmits and receives predetermined information to/from the first communication section 220. Specifically, the first communication section 220 transmits at least part of the partial data to be displayed to the second display section 300, to the second communication section 320. Then the second communication section 320 supplies at least part of the partial data received from the first communication section 200, to the second display control section 310 and the second storage unit 330. Further, the first communication section 220 may receive the display data via a network such as the Internet, a memory, and so on. The first communication section 220 may store the received display data in the data storage section 232. The second display control section 310 causes, to be displayed to the second display section 300, the partial data received from the second communication section 320. In addition, the second display control section 310 may extract at least part of the partial data from the second storage unit 330.

The first display control section 210 acts on the data storage section 232 to acquire display data stored in the data storage section 232. Then the first display control section 210 causes the acquired data to be displayed to the first display section 200. Further, the first display control section 210 acts on the display partial area storage section 234 to acquire the area of the partial data stored in the display partial area storage section 234, in association with the positional relation information specifying the relative positional relation having been determined by the relative position determination section 250. Then the first display control section 210 extracts partial data that corresponds to the area acquired from the display partial area storage section 234, from among the display data stored in the data storage section 232. Following this, the first display control section 210 causes the second display section 300 to perform enlarged display of at least part of the extracted partial data.

To be more specific, the first display control section 210 causes the first communication section 220 to transmit, to the second communication section 320, the extracted partial data in association with the enlargement factor of the partial data. Note that the first display control section 210 may calculate the enlargement factor of the partial data, using the ratio of an area that the area of the partial data acquired from the display partial area storage section 234 occupies with respect to the area of the display area of the second display section 300. Then the second communication section 320 supplies, to the second display control section 310, the partial data associated with the enlargement factor of the partial data having been received from the first communication section 220. The second display control section 310 causes the second display section 300 to perform enlarged display of the partial data at the enlargement factor of the partial data.

For example, suppose a case where the relative position determination section 250 has determined that the first display section 200 and the second display section 300 overlap each other in the display direction. In this case, the first display control section 210 extracts the area of the partial data that is part of the display data on display by the first display section 200 that is overlapped with the second display section 300, which has been stored in the display partial area storage section 234 in association with the positional relation information indicating that the first display section 200 and the second display section 300 are overlapping each other in the display direction. Following this, the first display control section 210 causes the first communication section 220 to transmit, to the second communication section 320, the extracted partial data associated with the enlargement factor of the partial data. The second communication section 320 supplies, to the second display control section 310, the partial data associated with the enlargement factor of the partial data having been received from the first communication section 220. Then the second display control section 310 may cause the second display section 300 to perform enlarged display of the partial data, with the enlargement factor of the partial data.

For example, suppose a case where a user has moved the second display section 300 by overlapping it with the first display section 200 from a position corresponding to an upper edge of the display data on display by the first display section 200 (hereinafter occasionally simply "upper-edge position") down to a position corresponding to a lower edge of the display data on display by the first display section 200 (hereinafter occasionally simply "lower-edge position"). In such a case, the first display control section 210 may display to the second display section 300, by sequentially enlarging, the upper edge to the lower edge of the display data on display by the first display section 200, from when the second display section 300 is overlapped to the upper-edge position to when the second display section 300 is overlapped to the lower-edge position.

By such an arrangement, when a user has moved the second display section 300 from the upper edge down to the lower edge of the display data by keeping the first display section 200 overlapped with the second display section 300, part of the display data on display in the first display section 200 is enlarged to be displayed to the second display section 300. Therefore, the user is able to confirm, in the second display section 300, enlarged view of only a desired portion of the display data on display by the first display section 200 in a reduced display size.

In addition, suppose a case where the relative position determination section 250 has determined that both of the first display section 200 and the second display section 300 exist in a predetermined range in the first direction. In such a case, the first display control section 210 extracts the area of the partial data in the predetermined range in the first direction that is part of the display data on display in the first display section 200, which is stored by the display partial area storage section 234 in association with the positional relation information that indicates the range. Then the first display control section 210 causes the second display section 300 to perform enlarged display of at least part of the extracted area of the partial data.

For example, suppose a case when the second display section 300 moves in the first direction along a predetermined side of the first display section 200 and that a predetermined range in which both of the first display section 200 and the second display section 300 exist in the first direction is moved from a position corresponding to an upper edge of the display data on display in the first display section 200 to a position corresponding to a lower edge of the display data on display in the first display section 200. In such a case, the first display control section 210 may cause, to be displayed to the second display section 300, sequentially enlarged display from the upper edge to the lower edge of the display data on display in the first display section 200, while the second display section 300 is overlapped to the position corresponding to the upper edge of the display data on display in the first display section 200 to the position corresponding to the lower edge of the display data on display in the first display section 200.

According to the display system 10 relating to the present embodiment, it is possible to store the area of the partial data to be displayed in the second display section 300 that is part of the display data on display by the first display section 200, in association with the relative positional relation between the first display section 200 and the second display section 300. As a result, when the second display section 300 is overlapped to the first display section 200, or when the second display section 300 is placed along a predetermined side of the first display section 200, the second display section 300 is able to perform enlarged display of a part of the display data on display in the first display section 200. Accordingly, a user is able to grasp the entirety of the display data on display in the first display section 200, as well as to perform enlarged display of only a predetermined part of the display data that the user desires in the second display section 300 for the user to be able to view the details of the predetermined part.

Figure 3:
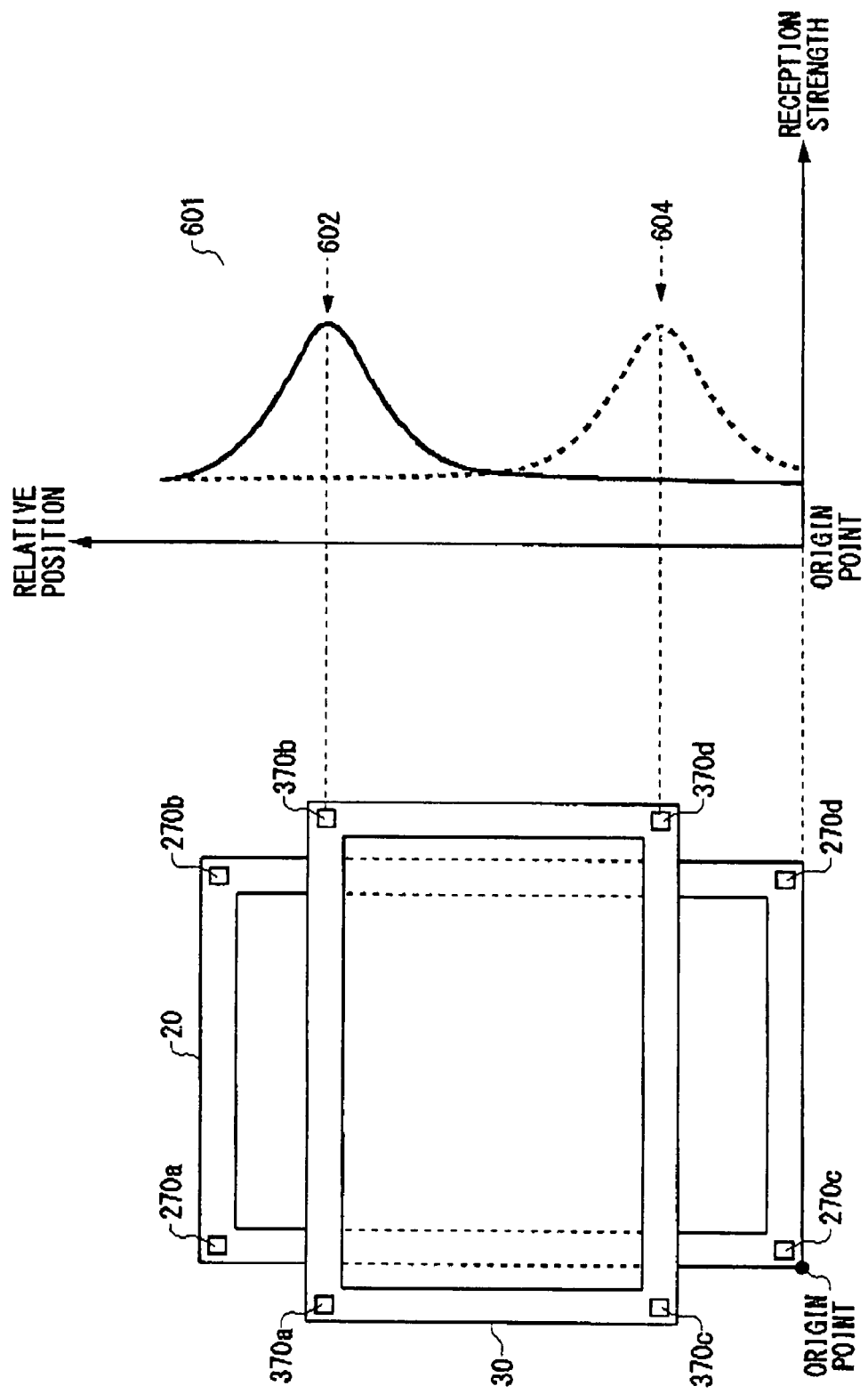
FIG. 3 shows a determination method of a relative position performed by a relative position determination section 250.

FIG. 3 shows one example of the determination method of a relative position performed by the relative position determination section 250 according to the present embodiment. First, the plurality of signal transmission sections 370 included in the second display apparatus 30 transmit identification signals at respectively different frequencies. The plurality of signal transmission sections 370 may transmit the identification signals at substantially the same signal strength. Then, the plurality of signal reception sections 270 included in the first display apparatus 20 receive the identification signals that the plurality of signal transmission sections 370 have transmitted at respectively different frequencies, respectively. Here, it should be noted that the first display apparatus 20 may own signal reception sections 270 in the vicinities respectively of the four corners thereof. Additionally, the first display apparatus 20 may own signal reception sections 270 in the vicinities respectively of a plurality of sides.

For example, suppose a case where the first display section 200 owns a signal reception section 270a, a signal reception section 270b, a signal reception section 270c, and a signal reception section 270d, respectively in the vicinities of the four corners thereof, and that the second display apparatus 30 owns a signal transmission section 370a, a signal transmission section 370b, a signal transmission section 370c, and a signal transmission section 370d, respectively in the vicinities of the four corners thereof. The signal transmission section 370a, the signal transmission section 370b, the signal transmission section 370c, and the signal transmission section 370d respectively transmit identification signals at respectively different frequencies. The plurality of signal reception sections 270 included in the first display section 200 respectively receive the identification signals transmitted by the signal transmission section 370a, the signal transmission section 370b, the signal transmission section 370c, and the signal transmission section 370d at respectively different frequencies. The signal strength calculation section 280 calculates the reception strengths of the received identification signals respectively received by the plurality of signal reception sections 270. Then, the relative position determination section 250 determines the relative position of the second display apparatus 30 with respect to the first display apparatus 20, from the reception strengths of the identification signals received by the plurality of signal reception sections 270, which have been calculated by the signal strength calculation section 280.

More specifically, the relative position determination section 250 sets a predetermined position of the first display apparatus 20 (e.g. one of the four corners) as an origin point, and calculates a position where the plurality of signal transmission sections 370 exist relative to the origin point, from the reception strengths of the identification signals respectively received from the plurality of signal transmission sections 370. For example, the relative position determination section 250 determines that the relative position of the signal transmission section 370a relative to the origin point corresponds to the relative position 602 indicated in the graph 601, from the reception strength of the identification signal that the signal reception section 270a received from the signal transmission section 370a. In addition, the relative position determination section 250 determines that the relative position of the signal transmission section 370c relative to the origin point corresponds to the relative position 604 indicated in the graph 601, from the reception strength of the identification signal that the signal reception section 270a received from the signal transmission section 370c.

The relative position determination section 250 calculates the relative position relative to the origin point for each of the plurality of signal transmission sections 370, from the reception strengths of the identification signals that the plurality of signal reception sections 270 received from the plurality of signal transmission sections 370 respectively. Then, the relative position determination section 250 calculates the relative position of the plurality of signal transmission sections 370 relative to the origin point, and determines the relative position of the second display apparatus 30 relative to the first display apparatus 20 based upon the calculation result. Note that the sizes of the first display apparatus 20 and of the second display apparatus 30 may be predetermined. When the sizes of the first display apparatus 20 and of the second display apparatus 30 are predetermined, it is sufficient if there are at least two signal transmission sections 370 in such a manner that there are a signal transmission section 370a and a signal transmission section 370d on a diagonal line of predetermined two corners of the second display apparatus 30, for example. The relative position determination section 250 supplies positional relation information indicating the determined relative positional relation between the first display section 200 and the second display section 300, to the first display control section 210.

Figure 4:
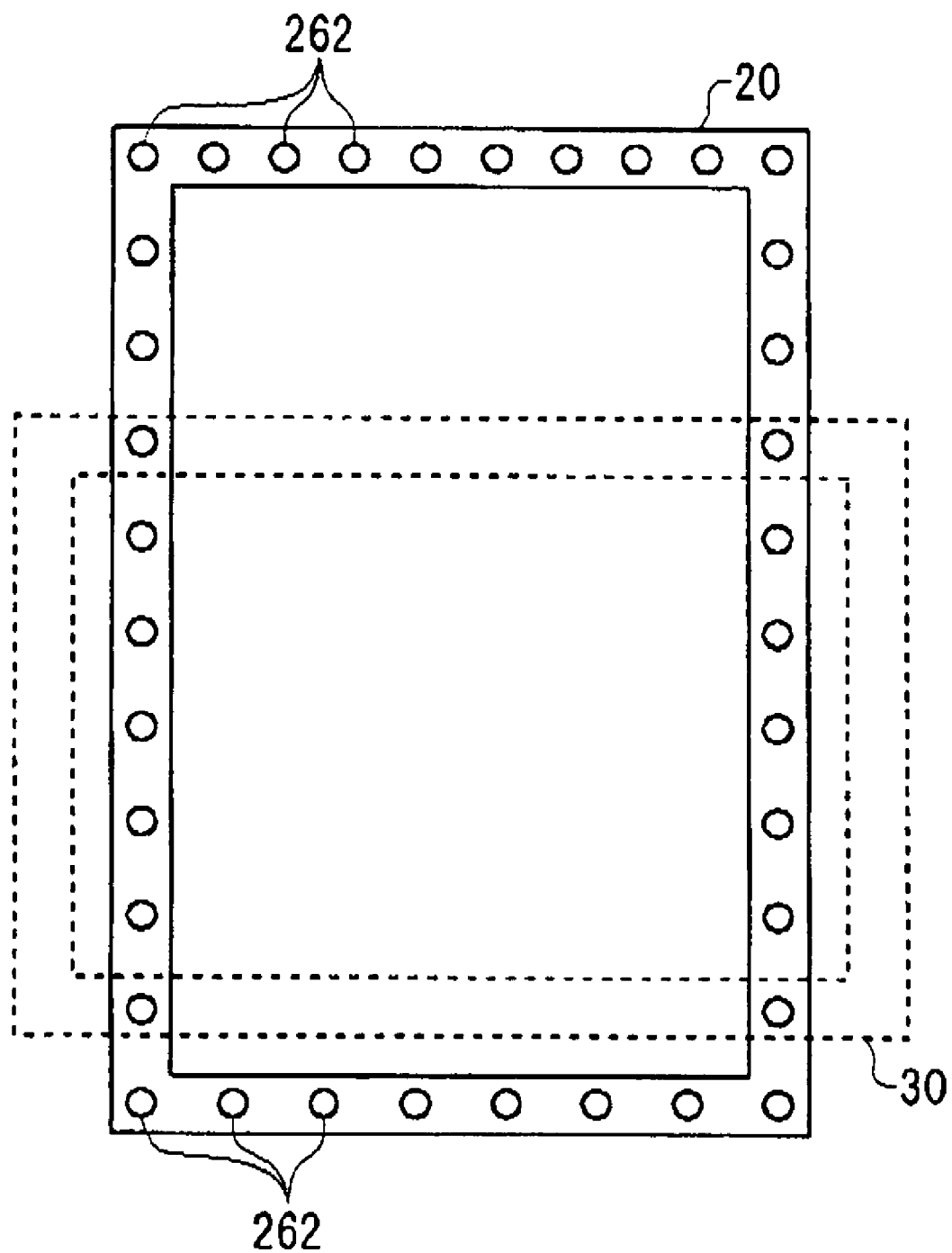
FIG. 4 shows a determination method of a relative position performed by the relative position determination section 250.

FIG. 4 shows one example of the determination method of a relative position performed by the relative position determination section 250 according to the present embodiment. First, the first display apparatus 20 may own the plurality of light sensors 262 along the vicinity of a plurality of sides thereof with a predetermined interval. In such a case, the plurality of light sensors 262 may be respectively associated with information specifying positions where the light sensors 262 exist relative to the origin point, where the origin point is set as a predetermined point of the first display apparatus 20.

Then, the plurality of light sensors 262 respectively detect the quantity of light irradiated thereto. The plurality of light sensors 262 supply the detected quantity of light to the relative position determination section 250, in association with information specifying the positions at which the plurality of light sensors 262 are placed relative to the first display apparatus 20.

The relative position determination section 250 determines which area of the first display apparatus 20 is covered by the second display apparatus 30, from the quantities of light respectively received from the plurality of light sensors 262 and the information specifying the positions of the plurality of light sensors 262 relative to the origin point. For example, the relative position determination section 250 determines the positions relative to the origin point of the plurality of light sensors 262 having detected the predetermined quantity of light or above, respectively. Then the relative position determination section 250 may determine that the second display apparatus 30 does not overlap at positions where a plurality of light sensors 262 for which the predetermined quantity of light or above has been detected. The relative position determination section 250 supplies the positional relation information indicating the determined relative positional relation between the first display section 200 and the second display section 300, to the first display control section 210.

Figure 5:
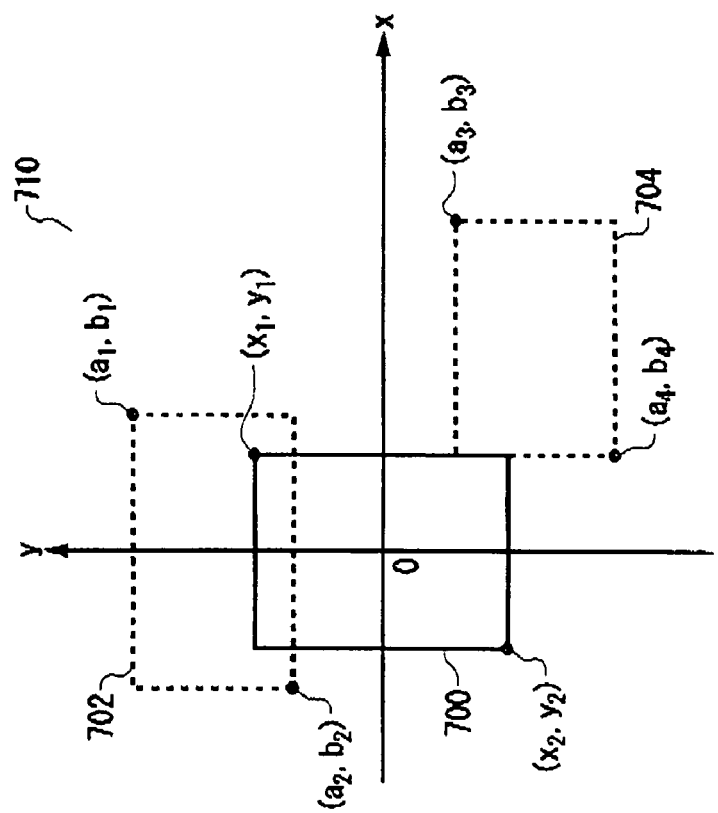
FIG. 5 shows a data structure of a display partial area storage section 234.

FIG. 5 shows one example of a data structure of the display partial area storage section 234 according to the present embodiment. The display partial area storage section 234 stores an area of partial data that is part of the display data on display in the first display section 200 that is to be displayed to the second display section 300, in association with the positional relation information indicating the relative positional relation between the first display section 200 and the second display section 300. For example, when the barycenter of the first display section 200 is set as the origin point, assume that the area in which the first display section 200 exists is the area 700. In such a case, the area in which the first display section 200 exists may be defined by coordinates (x1, y1) and coordinates (x2, y2).

First, the positional relation information indicating the relative positional relation between the first display section 200 and the second display section 300 may be represented by coordinate data that defines an area that the second display section 300 occupies relative to the origin point having set. For example, when the second display section 300 exists in the area 702, the positional relation information may be defined by coordinates (a1, b1) and coordinates (a2, b2). Further, when the second display section 300 exists in the area 704, the positional relation information may be defined by coordinates (a3, b3) and coordinates (a4, b4).

Then, the display partial area storage section 234 stores the area of the partial data that is part of the display data on display in the first display section 200 that is to be displayed in the second display section 300, in association with the positional relation information. For example, suppose a case of the area 702. The area 702 corresponds to a case where the first display section 200 and the second display section 300 overlap each other. In such a case, when the positional relation information indicates a case where the upper edge of the second display section 300 does not overlap with the first display section 200, i.e. when the positional relation information represented with use of the coordinate data indicates "(x2<a1<x1) and (y2<b2<y1<b1)", the display partial area storage section 234 stores the area defined by the coordinates (x1, y1) and the coordinates (x2, b2) as the area of the partial data.

Also when the positional relation information represented with use of the coordinate data indicates "(x2<a2<x1) and (y2<b2<y1<b1)", the display partial area storage section 234 may store the area defined by the coordinates (x1, y1) and the coordinates (x2, b2) as the area of the partial data, as a display partial area. Further, when the positional relation information indicates a case where the lower edge of the second display section 300 is not overlapped with the first display section 200, i.e. when the positional relation information represented with use of the coordinate data indicates "(x2<a1<x1) and (b2<y2<b1<y1)", the display partial area storage section 234 may store the area defined by the coordinates (x1, b1) and the coordinates (x2, y2) as the area of the partial area, as a display partial area.

Additionally, suppose a case where the second display section 300 exists along a predetermined side of the first display section 200 (i.e. the case where the second display section 300 exists in the area 704). In such a case, when the positional relation information represented with use of the coordinate data indicates (b4<y2≦b3≦y1), the display partial area storage section 234 may store the area defined by the coordinates (x1, b3) and the coordinates (x2, y2) as the area of the partial area, as a display partial area. In addition, when the positional relation information represented with use of the coordinate data indicates (y2≦b4≦y1<b3), the display partial area storage section 234 may store the area defined by the coordinates (x1, y1) and the coordinates (x2, b4) as the area of the partial area, as a display partial area.

Figure 6:
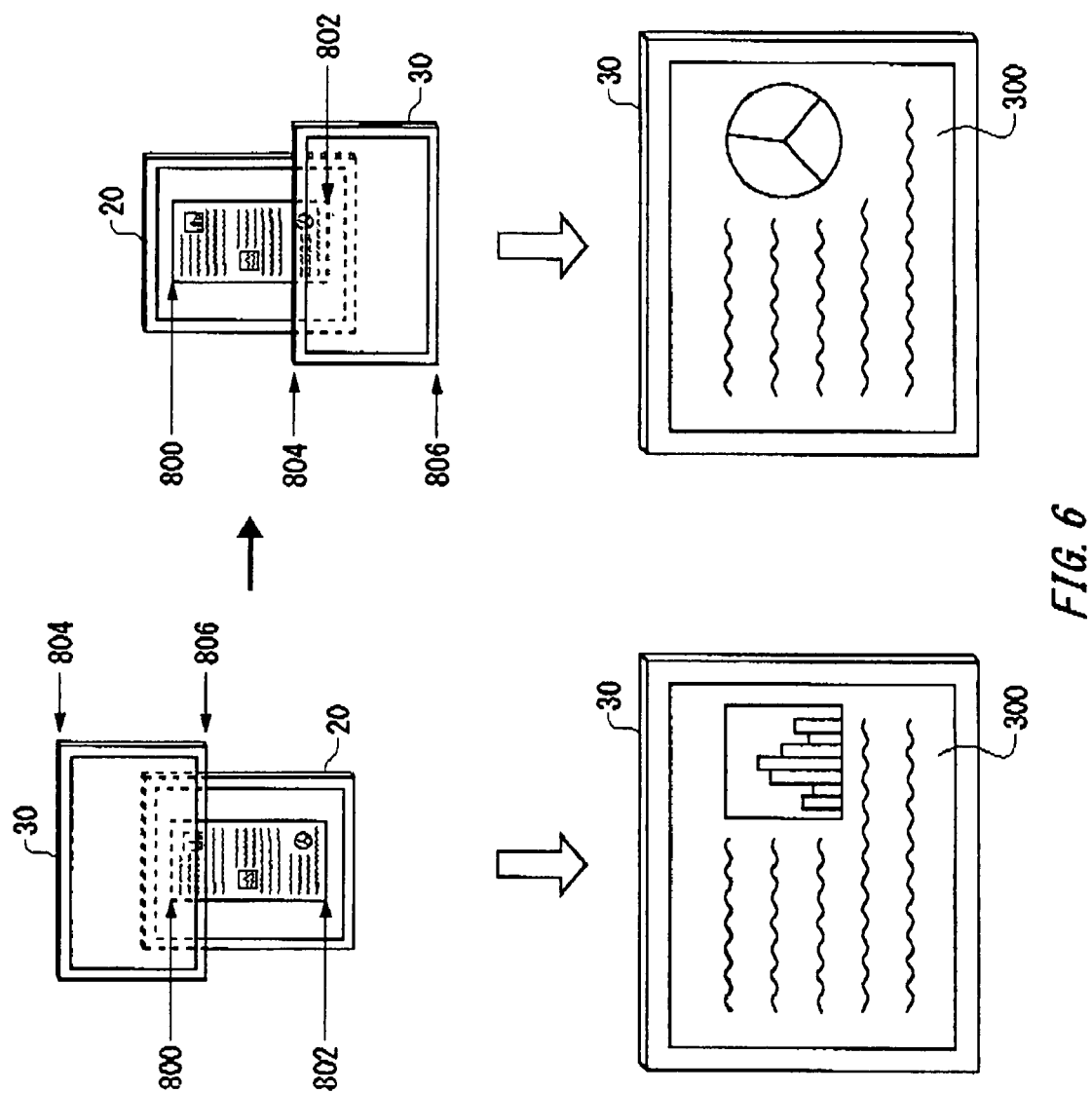
FIG. 6 is a diagram showing an example of display of the display data in the display system 10.

FIG. 6 shows one example of the display of the display data in the display system 10 according to the present embodiment. The first display apparatus 20 displays the entirety of the display data by reducing the size of the display data. In this case, suppose when the second display apparatus 30 is overlapped to the first display apparatus 20. When the second display apparatus 30 is overlapped to the first display apparatus 20, the first display apparatus 20 determines the relative position of the second display apparatus 30 relative to the first display apparatus 20. For example, the first display apparatus 20 determines the relative position from the quantity of light respectively received from the plurality of light sensors 262 included in the first display apparatus 20 and the positions that the plurality of light sensors 262 occupy relative to the first display apparatus 20. Then the first display apparatus 20 extracts the area of the partial data to be displayed to the second display section 30 according to the determined relative position, from the display partial area storage section 234. Then, the first display apparatus 20 performs enlarged display of at least part of the area of the partial data extracted from the display partial area storage section 234, to the second display apparatus 30.

For example, suppose a case where the second display section 300 is moved by being overlapped to the first display section 200, from a position where the lower edge 806 of the second display apparatus 30 is overlapped to the upper edge 800 of the display data displayed by the first display section 200 to a position where the upper edge 804 of the second display section 300 is overlapped to the lower edge 802 of the display data displayed by the first display section 200. In such a case, the first display control section 210 included in the first display apparatus 20 performs display to the second display section 300, by sequentially enlarging, at least a part of the display data displayed in the first display section 200 from the upper edge 800 to the lower edge 802 of the display data on display in the first display first display section 200, from when the second display section 300 is overlapped to the upper edge 800 of the display data displayed by the first display section 200, to when the second display section 300 is overlapped to the lower edge 802 of the display data displayed by the first display section 200. By such an arrangement, it becomes possible to perform, to the second display section 300, enlarged display of a predetermined area of the display data on display by the first display section 200 in a reduced size.

Figure 7:
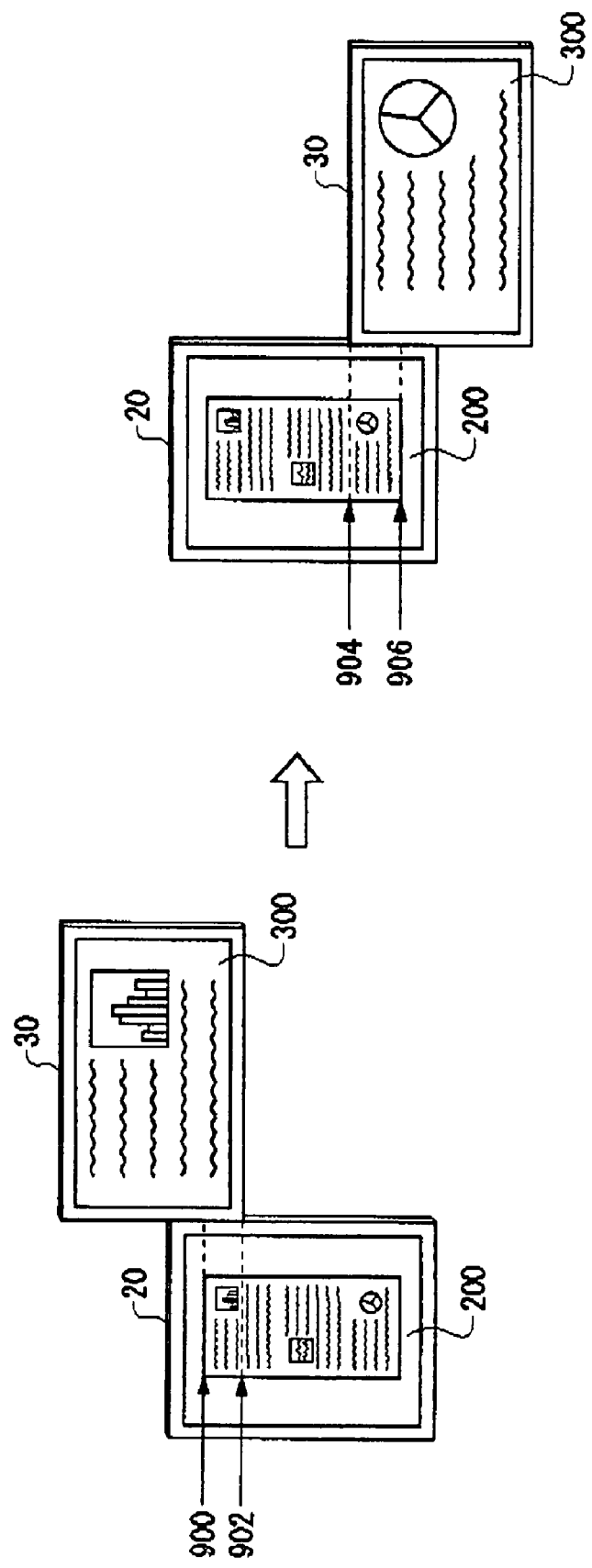
FIG. 7 is a diagram showing an example of display of the display data in the display system 10.

FIG. 7 shows one example of the display of the display data in the display system 10 relating to the present embodiment. The first display apparatus 20 displays the entirety of the display data by reducing the size of the display data. In this case, suppose when the second display apparatus 30 is placed along a predetermined side of the first display apparatus 20. When the second display apparatus 30 is placed along the first display apparatus 20, the first display apparatus 20 determines the relative position of the second display apparatus 30 relative to the first display apparatus 20. For example, the first display apparatus 20 determines the relative position from the reception strengths of the identification signals respectively received from the plurality of signal transmission sections 370 included in the second display apparatus 30. Then, the first display apparatus 20 extracts the area of the partial data to be displayed to the second display apparatus 30 from the display partial area storage section 234, according to the determined relative position. Then the first display apparatus 20 performs, to the second display apparatus 30, enlarged display of at least part of the area of the partial data extracted from the display partial area storage section 234.

For example, suppose a case where a predetermined range in which both of the first display section 200 and the second display section 300 exist in the first direction (the first direction being, for example, a direction that goes from the upper edge 900 of the display data to the lower edge 906 of the display data) is moved from the position of the upper edge 900 of the display data displayed by the first display section 200 to the lower edge 906 of the display data displayed by the first display section 200. Note that in the above explanation, "the predetermined range" is the range defined by an area from the upper edge 900 of the display data up to the position 902 that is apart into the first direction by a predetermined distance. In such a case, the first display control section 210 performs enlarged display of at least part of the display data on display by the first display section 200 from the upper edge 900 to the lower end 906 of the display data, from when the predetermined range is overlapped to the position of the upper edge 900 of the display data displayed by the first display section 200 to when the predetermined range is overlapped to the position of the lower edge 906 of the display data displayed by the first display section 200.

Figure 8:
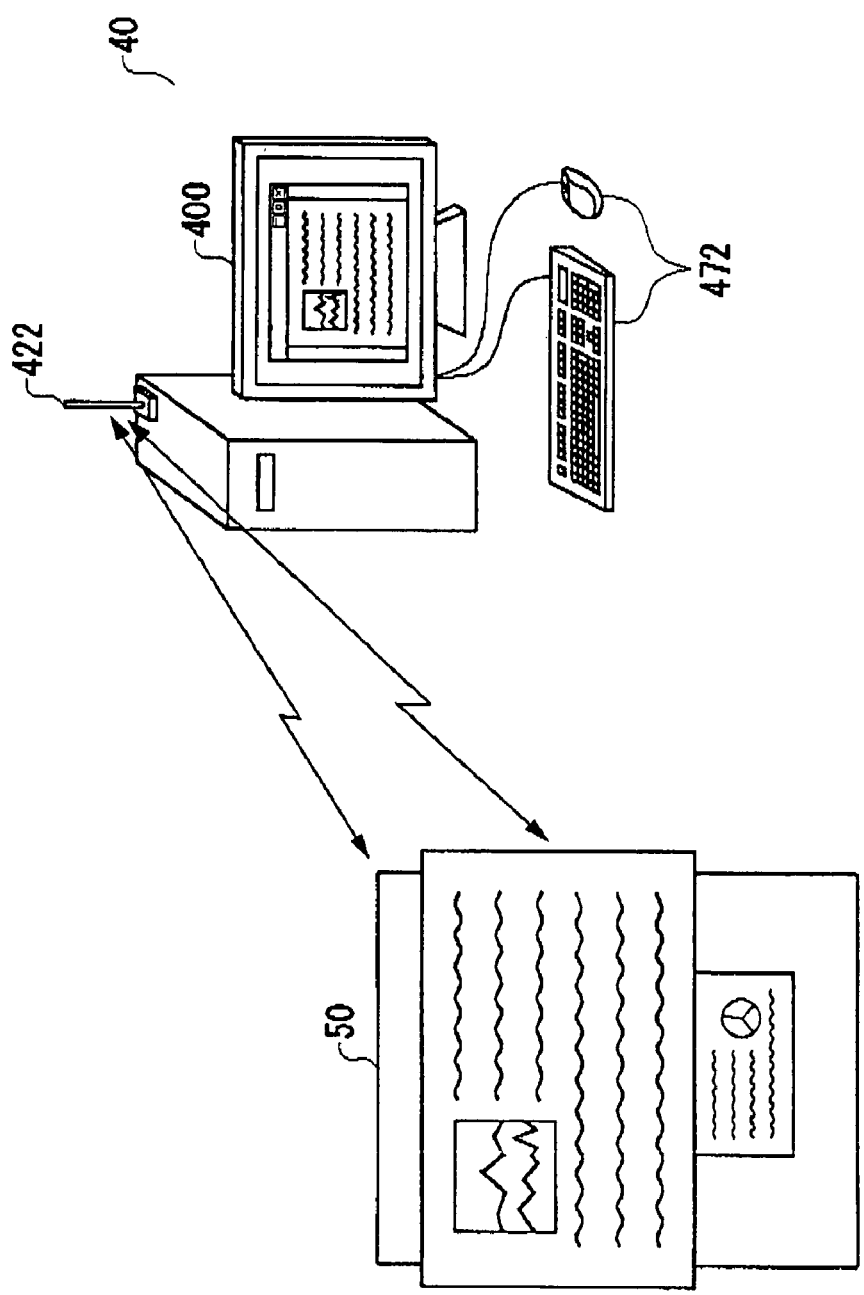
FIG. 8 is a schematic diagram of a display system 12.

FIG. 8 shows a brief overview of a display system 12 according to a different embodiment according to the present invention. The display system 12 includes electronic paper 50, electronic paper 60, and an information processing apparatus 40. The display system 12 according to the present embodiment aims to perform, to the electronic paper 60, enlarged display of part of the display data on display by the electronic paper 50, based on the relative position of the electronic paper 60 relative to the electronic paper 50. Note that the electronic paper 50 and the electronic paper 60 may be an electronic medium for displaying and retaining divisional data in a visually recognizable manner under a condition where there is no power supplied thereto. Furthermore, the electronic paper 50 and the electronic paper 60 may be for example any one of a flexible display, rewritable paper, a paper-like display, digital paper, electronic paper, an electronic sheet, and an electronic display sheet.

First, the electronic paper 50 displays the entirety of the display data by reducing the display size of the display data. For example, the electronic paper 50 receives the display data from the information processing apparatus 40, and displays the received display data. The display data may be a plurality of pages of display data. Examples of the display data are document data, image data, and weblog data which is disclosed on the Internet and so on. When a user overlaps the electronic paper 60 to the electronic paper 50, enlarged display of a part of the display data displayed on the electronic paper 50 is performed to the electronic paper 60, depending on the relative position between the electronic paper 50 and the electronic paper 60. Note that also when the electronic paper 60 is placed along a predetermined side of the electronic paper 50, enlarged display of a predetermined portion of the display data on display in the electronic paper 50 is performed to the electronic paper 60.

For example, suppose a case when the electronic paper 60 is moved in a predetermined direction relative to the electronic paper 50. The electronic paper 60 may be moved by being overlapped to the electronic paper 50, or moved without being overlapped to the electronic paper 50. In such a case, the information processing apparatus 40 identifies the positions of the electronic paper 50 and the electronic paper 60 respectively relative to the information processing apparatus 40. Specifically, the information processing apparatus 40 receives identifiers respectively transmitted by the electronic paper 50 and the electronic paper 60 via antennas 422 installed in at least three predetermined positions with the respective antennas 422. Then, the information processing apparatus 40 respectively identifies the positions of the electronic paper 50 and the electronic paper 60 relative to the information processing apparatus 40, from the respective reception strengths obtained when the plurality of antennas 422 received the identifiers respectively from the electronic paper 50 and the electronic paper 60, using the measurements at the three points.

Following this, the information processing apparatus 40 determines the relative position of the electronic paper 60 relative to the electronic paper 50, from information indicating the respectively identified positions of the electronic paper 50 and the electronic paper 60. Then, for example when the electronic paper 60 is overlapped on the electronic paper 50, the information processing apparatus 40 extracts partial data that is at least part of the display data corresponding to the overlapping portion between the electronic paper 50 and the electronic paper 60, from among the display data displayed on the electronic paper 50. Then, the information processing apparatus 40 displays the extracted partial data to the electronic paper 60, by sequentially enlarging the partial data to the size of the display area of the electronic paper 60.

In addition, a user may perform change to the contents of the display data in the information processing apparatus 40. For example, a user can input desired information from an information input section 472, to change the contents of the display data. Note examples of the information input section 472 are a keyboard, a mouse, etc. Then the information processing apparatus 40 transmits the display data of which the contents have been changed, to the electronic paper 50 via the antennas 422. Subsequently, the electronic paper 50 displays the display data after change. In this case, when the electronic paper 60 is overlapped to the electronic paper 50, enlarged display of a part of the display data after change is performed to the electronic paper 60, in the similar manner as described above.

The display system 12 according to the present embodiment is able to perform, to the electronic paper 60, enlarged display of a part of the display data on display by the electronic paper 50 in a reduced display size. As a result, a user is able to grasp the entire image of the display data, in the electronic paper 50, while enabling enlarged display of only a part of the display data that the user desires, to the electronic paper 60.

In addition, according to the display system 12 relating to the present embodiment, a user is able to perform, to the electronic paper 60, enlarged display of only a user's desired part of the display data on display by the electronic paper 50 in a reduced display size. As a result, a user is able to carry only a necessary part to the user by displaying the part in the electronic paper 60.

Figure 9:
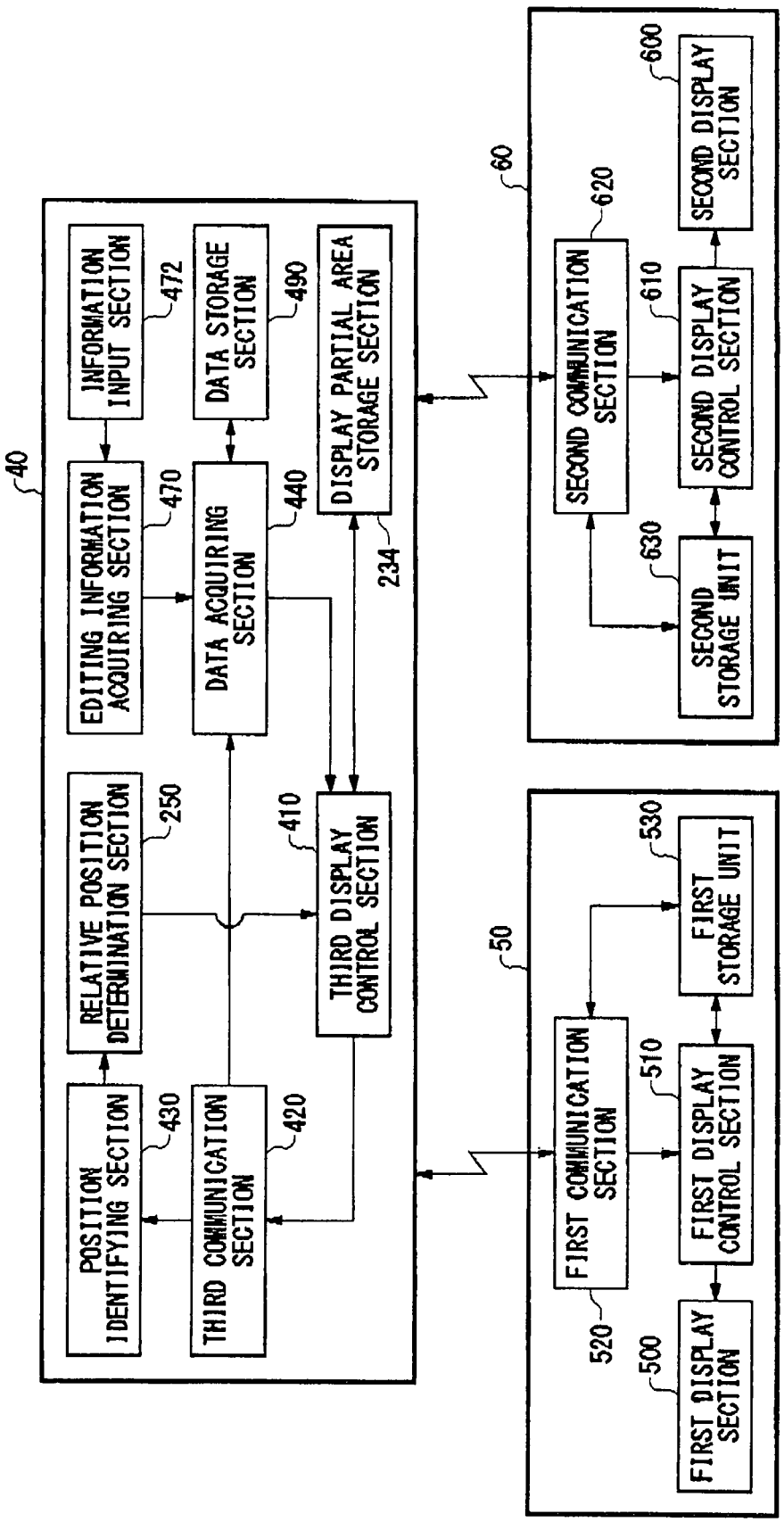
FIG. 9 is a block diagram showing a functional configuration of the display system 12.

FIG. 9 shows one example of a functional configuration of the display system 12 according to the present embodiment. The display system 12 includes electronic paper 50, electronic paper 60, and an information processing apparatus 40. The electronic paper 50 includes the first display section 500, the first display control section 510, the first communication section 520, and the first storage unit 530. The electronic paper 60 includes the second display section 600, the second display control section 610, the second communication section 620, and the second storage unit 630. Then, the information processing apparatus 40 includes a display partial area storage section 234, a relative position determination section 250, the third display control section 410, the third communication section 420, a position identifying section 430, a data acquiring section 440, an editing instruction acquiring section 470, an information input section 472, and a data storage section 490.

Note that the display system 12 may be further equipped with part or all of the function or the configuration of the display system 10 explained above with reference to the drawings from FIG. 1 to FIG. 7. In addition, members having the same reference numerals as those of the members explained above with reference the drawings from FIG. 1 to FIG. 7 play the same function as those described above, and so detailed explanation thereof is omitted in the following.

The first storage unit 530 stores display data to be displayed to the first display section 500 and a first electronic paper identifier identifying the electronic paper 50. In addition, the first storage unit 530 may store a display data identifier identifying the display data to be displayed to the first display section 500. The first storage unit 530 supplies the display data to the first display control section 510 by being controlled by the first display control section 510. Further, the first storage unit 530 supplies the first electronic paper identifier and the display data identifier to the first communication section 520, by being controlled by the first communication section 520. In addition, the second storage unit 630 stores a second electronic paper identifier identifying the electronic paper 60. Further, the second storage Unit 630 stores partial data to be displayed to the second display section 600. The second storage unit 630 supplies the partial data to the second display control section 610 by being controlled by the second display control section 610. Further, the second storage unit 630 supplies the second electronic paper identifier to the second communication section 620 by being controlled by the second communication section 620.

The first communication section 520 acts on the first storage unit 530 to transmit the first electronic paper identifier and the display data identifier to the information processing apparatus 40. The first communication section 520 may include a plurality of electronic-paper-side antennas. The plurality of electronic-paper-side antennas may be respectively placed to predetermined positions of the electronic paper 50. Moreover, the plurality of electronic-paper-side antennas may be associated with antenna identifiers identifying the electronic-paper-side antennas respectively. The first communication section 520 associates antenna identifiers identifying the plurality of electronic-paper-side antennas to first electronic paper identifiers, and transmits the first electronic paper identifiers to the information processing apparatus 40 from the plurality of electronic-paper-side antennas respectively. In addition, the first communication section 520 receives the display data from the information processing apparatus 40. The first communication section 520 stores the received display data to the first storage unit 530. In addition, the first communication section 520 may supply the received display data to the first display control section 510.

The second communication section 620 acts on the second storage unit 630 to transmit the second electronic paper identifier to the information processing apparatus 40. The second communication section 620 may also include a plurality of electronic-paper-side antennas, as in the case of the first communication section 520. The second communication section 620 may also have substantially the same function and configuration as those of the first communication section 520, and so detailed explanation of the second communication section 620 is omitted. Note that the second communication section 620 receives partial data from the information processing apparatus 40. The second communication section 620 stores the received partial data to the second storage unit 630. The second communication section 620 may supply the received partial data to the second display control section 610.

The first display control section 510 causes the first display section 500 to display the display data acquired by acting on the first storage unit 530 or the display data received from the first communication section 520. The first display section 500 displays the display data by being controlled by the first display control section 510. The second display control section 610 performs, to the second display section 600, enlarged display of the partial data acquired by acting on the second storage unit 630 or the partial data received from the second communication section 620, by enlarging the corresponding partial data to the size of the display area of the second display section 600. The second display section 600 performs enlarged display of at least part of the display data on display by the first display section 500, by being controlled by the second display control section 610.

The third communication section 420 receives the first electronic paper identifier and the second electronic paper identifier from the electronic paper 50 and the electronic paper 60 respectively. In addition, the third communication section 420 receives the display data identifier from the electronic paper 50. The third communication section 420 may include at least three antennas 422. The at least three antennas 422 may be placed in predetermined positions relative to the information processing apparatus 40. The third communication section 420 receives the first electronic paper identifier respectively transmitted from the plurality of electronic-paper-side antennas included in the first communication section 520 in association with antenna identifiers identifying the plurality of electronic-paper-side antennas of the electronic paper 50 respectively, via the at least three antennas 422. In the similar way, the third communication section 420 receives the second electronic paper identifier respectively transmitted from the plurality of electronic-paper-side antennas included in the second communication section 620 in association with antenna identifiers identifying the plurality of electronic-paper-side antennas of the electronic paper 60 respectively, via the at least three antennas 422.

The third communication section 420 supplies, to the position identifying section 430, the plurality of first electronic paper identifier respectively associated with the plurality of antenna identifiers of the plurality of electronic-paper-side antennas included in the first communication section 520, together with reception strengths respectively when the at least three antennas 422 have received the plurality of first electronic paper identifiers. In the similar manner, the third communication section 420 supplies the plurality of second electronic paper identifiers respectively to the position identifying section 430. Further, when having received a display data identifier, the third communication section 420 supplies the received display data identifier to the data acquiring section 440. In addition, the third communication section 420 transmits the display data to the first communication section 520 by being controlled by the third display control section 410. Further, the third communication section 420 transmits the partial data to the second communication section 620 by being controlled by the third display control section 410.

The position identifying section 430 identifies the positions of the electronic paper 50 and the electronic paper 60, from the reception strength of the first electronic paper identifier received by the third communication section 420 and the reception strength of the second electronic paper identifier. Specifically, the position identifying section 430 identifies the position of the electronic paper 50 relative to the information processing apparatus 40, from the reception strengths respectively when the third communication section 420 has received, at the at least three antennas 422 included in the third communication section 420, the first electronic paper identifiers transmitted by the first communication section 520 to the third communication section 420, in association with antenna identifiers identifying the plurality of electronic-paper-side antennas of the first communication section 520.

For example, the first communication section 520 included in the electronic paper 50 may include electronic-paper-side antennas in the vicinities of the four corners thereof. First, the first electronic-paper-side antenna of the first communication section 520 transmits, to the third communication section 420, the first electronic paper identifier in association with the first antenna identifier identifying the first electronic-paper-side antenna. The third communication section 420 receives the first electronic paper identifier that is associated with the first antenna identifier, via the three antennas 422. In such a case, the three antennas 422 respectively supply reception strengths when receiving the first electronic paper identifier associated with the first antenna identifiers, to the position identifying section 430. In the similar manner, the remaining two antennas 422 included in the third communication section 420 supply reception strengths when receiving the first electronic paper identifier associated with the first antenna identifier, to the position identifying section 430.

The position identifying section 430 identifies the first electronic-paper-side antenna identified by the first antenna identifier, from the reception strengths when the three antennas 422 respectively receive the first electronic paper identifier associated with the first antenna identifier and the positions of the three antennas 422 relative to the information processing apparatus 40. In the similar manner, the position identifying section 430 identifies the respective positions of the remaining three electronic-paper-side antennas relative to the information processing apparatus 40, where the remaining three electronic-paper-side antennas are the second electronic-paper-side antenna, the third electronic-paper-side antenna, and the fourth electronic-paper-side antenna included in the first communication section 520 of the electronic paper 50. Accordingly, the position identifying section 430 identifies the position and the range of the electronic paper 50 relative to the information processing apparatus 40. In the similar manner, the position identifying section 430 identifies the position and the range of the electronic paper 60 relative to the information processing apparatus 40. Then the position identifying section 430 supplies information indicating the identified position and range, to the relative position determination section 250.

The relative position determination section 250 determines the relative positional relation between the electronic paper 60 and the electronic paper 50, from the positions of the electronic paper 50 and the electronic paper 60 identified by the position identifying section 430. The relative position determination section 250 supplies the determined relative positional relation between the electronic paper 60 and the electronic paper 50, to the third display control section 410. The third display control section 410 causes the second display section 600 to perform enlarged display of at least part of the partial data of the area stored in the display partial area storage section 234 in association with the positional relation information indicating the relative positional relation determined by the relative position determination section 250. Note that the third display control section 410 may be equipped with part or all of the functions of the first display control section 510 described above with reference to the drawings from FIG. 1 to FIG. 7, and so detailed explanation thereof is omitted in the following.

The information input section 472 receives an input of information from a user. The information input section 472 supplies an editing instruction of a user for the contents of the display data, to the editing instruction acquiring section 470. The editing instruction acquiring section 470 supplies an editing instruction of a user for the contents of the display data to the data acquiring section 440. The data storage section 490 stores display data in association with a display data identifier. The data storage section 490 supplies the display data to the data acquiring section 440, by being controlled by the data acquiring section 440. The data acquiring section 440 acquires, from the data storage section 490, display data identified by the display data identifier received from the third communication section 420. The data acquiring section 440 supplies the acquired display data to the third display control section 410. Additionally, the data acquiring section 440 displays the acquired display data on the monitor 400 that the information processing apparatus 40 further includes therein. Then, when receiving an editing instruction of a user from the editing instruction acquiring section 470, the data acquiring section 440 causes the contents of the display data to reflect the editing instruction. The data acquiring section 440 supplies either the acquired display data or the display data whose contents has been changed, to the third display control section 410.

The third display control section 410 enlarges at least part of the partial data of the area stored in the display partial area storage section 234 in association with the positional relation information indicating the relative positional relation determined by the relative position determination section 250. To be specific, the third display control section 410 receives the positional relation information from the relative position determination section 250. Then the third display control section 410 acquires the display partial area being the area of the partial data stored in the display partial area storage section 234 in association with the positional relation information received from the relative position determination section 250. Following this, the third display control section 410 extracts the partial data being a part that corresponds to the display partial area acquired from the display partial area storage section 234, from the display data received from the data acquiring section 440. The third display control section 410 supplies the extracted partial data to the third communication section 420. By being controlled by the third display control section 410, the third communication section 420 transmits the partial data to the second communication section 620 for displaying the partial data to the second display section 600.

According to the display system 12 relating to the present embodiment, it becomes possible to determine, in the information processing apparatus 40, the positional relation information indicating the relative position of the electronic paper 60 relative to the electronic paper 50. Additionally, it is possible to store the area of the partial data to be displayed to the electronic paper 60 that is part of the display data on display by the electronic paper 50, in association with the relative positional relation between the electronic paper 50 and the electronic paper 60. As a result, when overlapping the electronic paper 60 to the electronic paper 50, or when placing the electronic paper 60 along a predetermined side of the electronic paper 50, it is possible to perform enlarged display of part of the display data on display by the electronic paper 50, to the electronic paper 60, according to the relative position of the electronic paper 60 with respect to the electronic paper 50. Therefore, even when the electronic paper 50 or the electronic paper 60 does not have a special function, a user is still able to grasp the entire image of the display data on display by the electronic paper 50 and perform enlarged display of only a predetermined portion of the display data that the user desires, to view the details of the predetermined portion.

Figure 10:
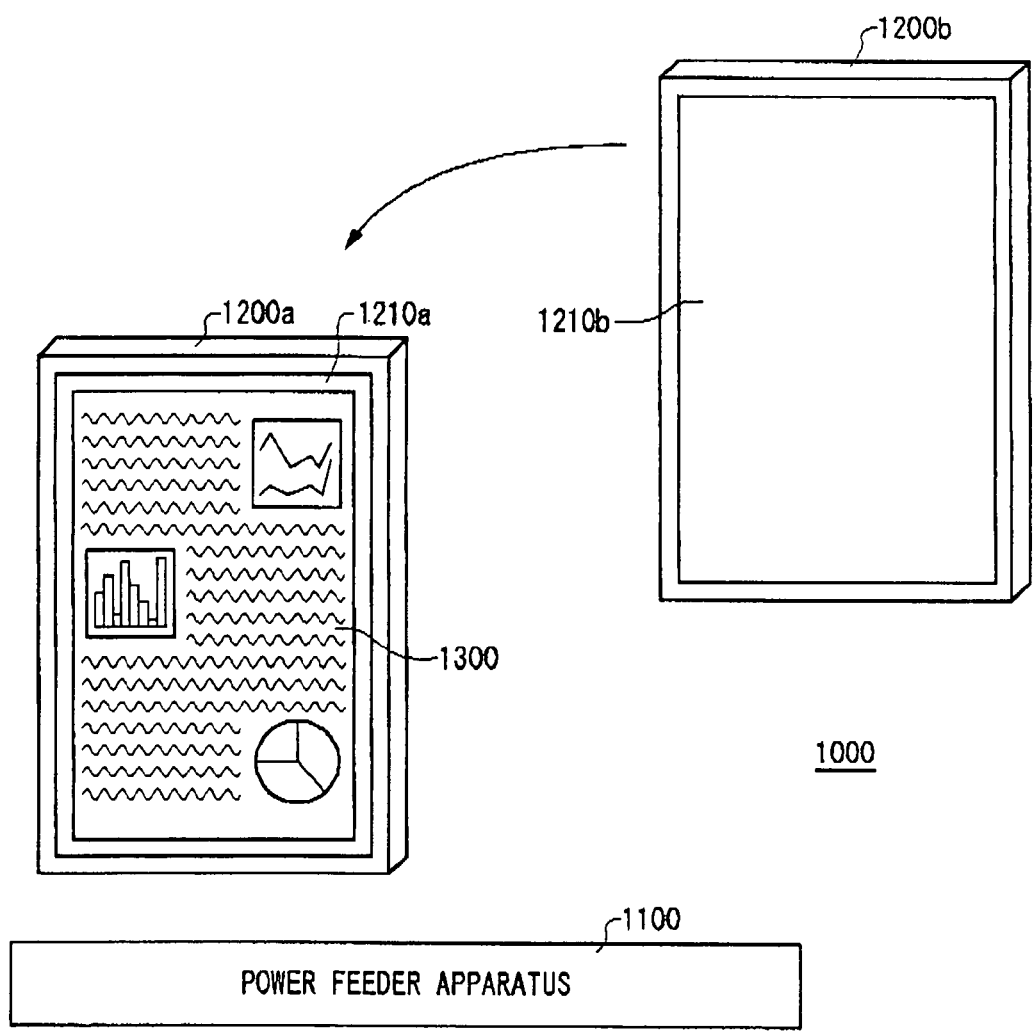
FIG. 10 shows one example of the display system 1000 of the present embodiment.

FIG. 10 shows one example of the display system 1000 of the present embodiment. The display system 1000 includes a power feeder apparatus 1100, a display apparatus 1200a, and a display apparatus 1200b.

The power feeder apparatus 1100 supplies power to the display apparatus 1200a and the display apparatus 1200b. Various power supply methods are usable as a power supply method. However, a wireless power supply method is preferable taking into account the portability of the display apparatus 1200a and of the display apparatus 1200b. One example of the wireless power supply method is a method of generating an alternate current magnetic field by means of the power feeder apparatus 1100 and inducing voltage to the coils respectively installed in the display apparatus 1200a and the display apparatus 1200b. Alternatively, it is also possible to cause the power feeder apparatus 1100 to generate an electromagnetic wave, and to supply power by means of antennas and so on respectively installed in the display apparatus 1200a and the display apparatus 1200b.

The display apparatus 1200a and the display apparatus 1200b may be electronic paper, for example. Cooperation between the display apparatus 1200a and the display apparatus 1200b causes the display system 1000 to function. The display apparatus 1200a includes a display section 1210a, and the display data 1300 is displayed to the display section 1210a. The display apparatus 1200b includes a display section 1210b.

The present embodiment takes an example where the display apparatus 1200a and the display apparatus 1200b are equivalent in terms of having the same structure and function. Accordingly, when either of the display apparatus 1200a and the display apparatus 1200b operates as a master, the other of the display apparatus 1200a and the display apparatus 1200b operates as a slave. Alternatively, both of the display apparatus 1200a and the display apparatus 1200b may be controlled by a single or a plurality of computer apparatus(es), for example. In addition, since the display apparatus 1200a and the display apparatus 1200b are structurally equivalent, unless it is necessary to distinguish between the display apparatus 1200a and the display apparatus 1200b, the display apparatus 1200a and the display apparatus 1200b are simply and collectively referred to as "a display apparatus 1200". In the following description, when any member of the display apparatus 1200 is assigned with a suffix such as "a" and "b", the members are meant to belong to the display apparatus 1200a and the display apparatus 1200b respectively.

Figure 11:
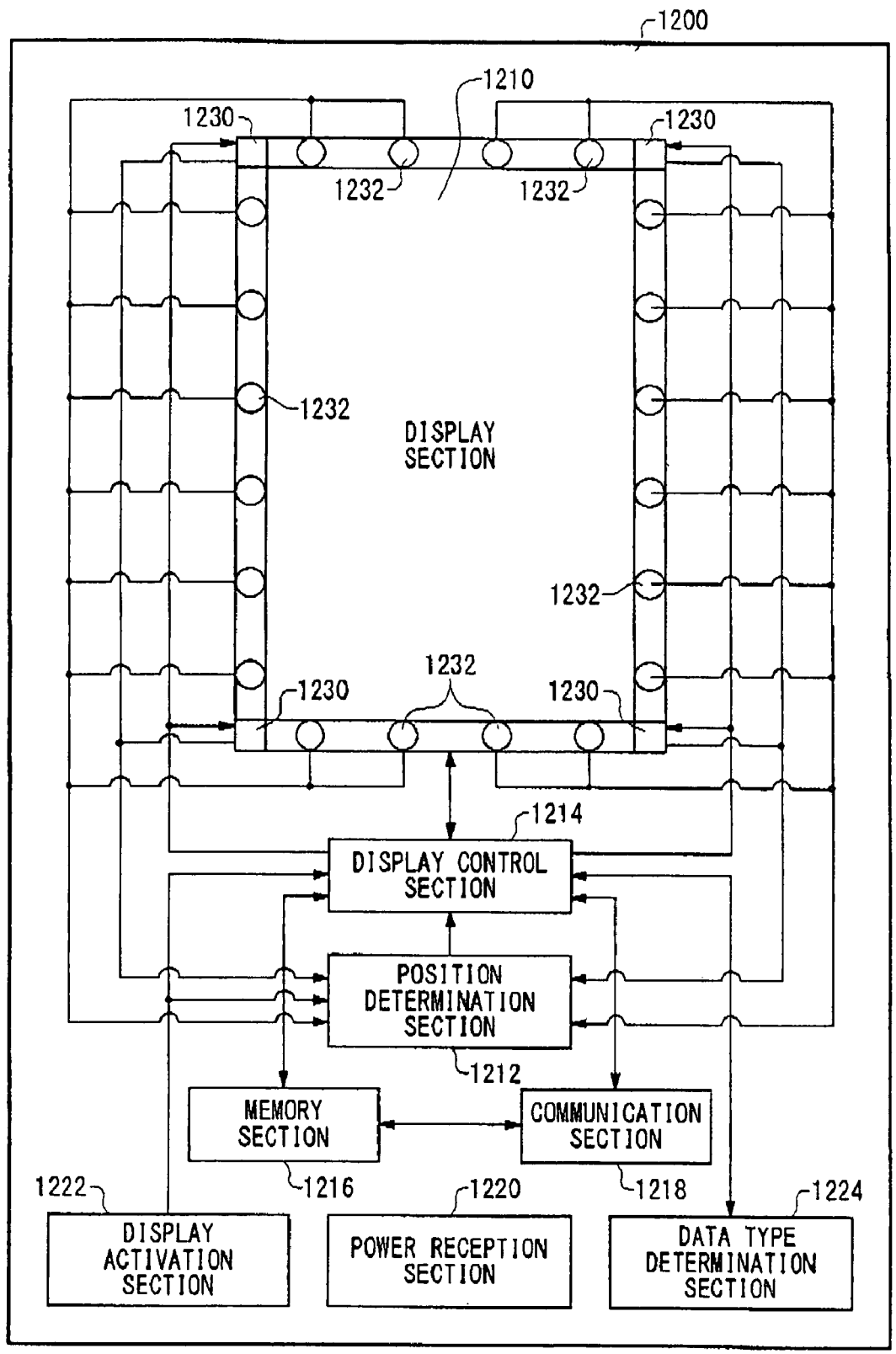
FIG. 11 shows one example of a display apparatus 1200.

FIG. 11 shows one example of the display apparatus 1200. The display apparatus 1200 includes a display section 1210, a position determination section 1212, a display control section 1214, a memory section 1216, a communication section 1218, a power reception section 1220, a display activation section 1222, and a data type determination section 1224. The display section 1210 includes a plurality of signal reception/transmission sections 1230 and a plurality of light detection sections 1232.

The display section 1210 may be a display section of electronic paper, for example, and displays data such as characters (text), charts or diagrams, images, and the like, by being controlled by the display control section 1214. When the display section 1210 is a display section of electronic paper, the display in the display section 1210 is maintained even if the power supply is cut off from the display apparatus 1200. The display/non-display according to each pixel of the display section 1210 is controlled by passive matrices or active matrices, and color display of the display section 1210 is enabled by either using a color filter or using a coloring material as the pixel material.

The display section 1210a of the display apparatus 1200a displays the display data 1300. The display section 1210a is one example of the first display section, and the display data 1300 is one example of display data. Here, what is meant by the display data 1300 is data currently on display by the display section 1210a which is one example of the first display section. Accordingly, the display data 1300 is updated in accordance with display update directed to the display section 1210a.

The display section 1210b of the display apparatus 1200b displays either partial data of the display data 1300 or adjacent document data adjacent to the display data 1300. The display section 1210b is one example of the second display section. Here, what is meant by the partial data is either all or part of the display data 1300. Moreover, what is meant by the adjacent document data is document data that is conceptually adjacent to the document data 1300. For example, if the display data 1300 is data displaying an arbitrary page of document data, the adjacent document data corresponds to a previous page or a subsequent page of the page on display as the display data 1300.

The display section 1210 includes a plurality of signal reception/transmission sections 1230. For example, the signal reception/transmission sections 1230 may be placed to the four corners of the display section 1210. The signal reception/transmission sections 1230 are one example of a signal transmission section and a signal reception section. In the present embodiment, each of the signal reception/transmission sections 1230 is illustrated as having both of a signal reception function and a signal transmission function. However, not limited to this structure, the signal reception/transmission sections 1230 may be classified into signal reception sections and signal transmission sections.

Each of the signal reception/transmission sections 1230 transmits an identification signal that identifies from which display section and which placement position a particular signal comes from. In other words, each signal reception/transmission section 1230 transmits an identification signal that is unique to the signal reception/transmission section 1230. One identification method is to assign a transmission frequency for each identification signal. Another identification method is to assign an identification code to each identification signal. When transmitting an identification signal with use of the same frequency in the case of assigning an identification code, a negotiation process is introduced to control a transmission timing for each signal reception/transmission section 1230 for the purpose of preventing interference.

In addition, the signal reception/transmission section 1230 receives each identification signal transmitted from the plurality of signal reception/transmission section 1230. Since both of the display section 1210a and the display section 1210b include a respective signal transmission/reception section 1230, this means that signal transmission sections and signal reception sections, being transmission/reception sections 1230, are included in both of the display section 1210a and the display section 1210b. However, when the signal reception/transmission section 1230 are classified into signal transmission sections and signal reception sections, it is possible to arrange so that one of the display sections (e.g. display section 1210a) includes one of a signal transmission section and a signal reception section (e.g. a signal transmission section), and that the other of the display sections (e.g. display section 1210b) includes the other of a signal transmission section and a signal reception section (e.g. a signal reception section).

A plurality of light detection sections 1232 are provided in a periphery of the display section 1210. The light detection sections 1232 detect light in the periphery of the display section 1210. One example of the light detection sections 1232 is a photosensor having a sensitivity in the visible light region. Note that in the present embodiment, both of the display section 1210a and the display section 1210b include light detection sections 1232. However, in the case where either one of the display apparatus 1200a and the display apparatus 1200b is always scheduled to be placed later than the other, it is possible to arrange so that the firstly placed display apparatus 1200 includes the light detection sections 1232.

The position determination section 1212 determines the positional relation between the display section 1210a of the display apparatus 1200a and the display section 1210b of the display apparatus 1200b. For example, the position determination section 1212 determines the positional relation between the display section 1210a and the display section 1210b, by receiving the identification signal from the signal reception/transmission section 1230 and the light intensity signal from the light detection section 1232 and by using these signals. Note that each of the display apparatus 1200a and the display apparatus 1200b includes a position determination section 1212. However, when one of the position determination sections 1212 is able to convey the determined positional relation to the other, both of the position determination sections 1212 do not necessarily operate independently from each other.

When the position determination section 1212 determines the positional relation by receiving the identification signal from the signal reception/transmission section 1230, the following operation is performed for example. The position determination section 1212 identifies the position of the signal reception/transmission section 1230 having transmitted the identification signal, from each placed position of the signal reception/transmission section 1230 having received the identification signal in the display section 1210, and the strength of the identification signal received by the signal reception/transmission section 1230 in each placed position, using the display section 1210 at the reception side as a reference. For example, in the case of using the display section 1210a as a reference, respective signal reception/transmission sections 1230*a* placed at the four corners of the display section 1210*a* are to receive identification signals from respective signal reception/transmission sections 1230*b* placed at the four corners of the display section 1210*b* respectively.

By either setting the same transmission strength to identification signals or performing calibration by measuring the reception strength in a known distance in advance, the reception strength of a signal becomes a function of a distance. Therefore, it become possible to obtain the distance up to an arbitrary signal reception/transmission section 1230 at the transmission side, by measuring the strength of the identification signal in an arbitrary signal reception/transmission section 1230 at the reception side. Since the placed position of the signal reception/transmission section 1230 in the display section 1210 is known, if the strength of the identification signals for at least three positions in a signal reception/transmission section 1230 (e.g. signal reception/transmission section 1230*a*) of a display section 1210 at the reception side (e.g. the display section 1210*a*) is measured, it is possible to identify the position of a signal reception/transmission section 1230 (e.g. the signal reception/transmission section 1230*b*) with reference to the display section 1210 at the reception side.

If such identification of a signal reception/transmission section 1230 is performed for at least three positions of the display section 1210 at the transmission side (e.g. display section 1210*b*), it is possible to identify the position of a display section 1210 at the transmission side using the display section 1210 at the reception side as a reference. In other words, the positional relation between the display sections 1210 both at the transmission side and the reception side, being one example of the first display section and the second display section respectively, is determined from the identified position of the signal reception/transmission section 1230 at the transmission side being one example of the signal transmission section and from the placed position of the signal reception/transmission section 1230 at the transmission side in the display section 1210.

In the case that the position determination section 1212 determines the positional relation by receiving the light intensity signal from the light detection section 1232, the following operation is performed for example. The position determination section 1212 determines the positional relation between the display section 1210*a* and the display section 1210*b*, from the placed positions of the light detection sections 1232 in the display section 1210 and from the intensity of light detected by each of the light detection sections 1232. For example, when the light intensity detected by particular light detection sections 1232*a* of the light detection sections 1232*a* of the display section 1210*a* is weak, it is determined that the display section 1210*b* is overlapped to cover the area including the particular light detection section 1232*a*. Conversely, when the light intensity detected by particular light detection sections 1232*b* of the light detection sections 1232*b* of the display section 1210*b* is weak, it is determined that the display section 1210*a* is overlapped to cover the area including the particular light detection section 1232*b*. Note that by placing the light detection sections 1232 close to each other, it becomes possible to detect the overlapping area with accuracy in accordance with the placement density of the light detection sections 1232.

Note that examples of the positional relation that can be determined by the position determination section 1212 are: an overlapping relation in which the display section 1210*a* and the display section 1210*b* are overlapped to each other; an adjacent relation in which the display section 1210*a* and the display section 1210*b* are adjacent to each other; a same-directional relation in which the display section 1210*a* and the display section 1210*b* are placed in the same direction as each other; a different-directional relation in which the display section 1210*a* and the display section 1210*b* are placed in different directions from each other; and a held-up relation in which the display section 1210*a* and the display section 1210*b* are placed apart from the respective display surfaces.

The display control section 1214 controls data display onto the display section 1210. When the display section 1210*a* is displaying the display data 1300 and that the display apparatus 1200*a* and the display apparatus 1200*b* cooperate with each other, the display control section 1214*b* displays, to the display section 1210*b*, either partial data of the display data 1300 or adjacent document data that is adjacent to the display data 1300, according to the positional relation determined by either the position determination section 1212*a* or the position determination section 1212*b*. Note that although the display control section 1214*b* is in charge of direct control of the display onto the display section 1210*b*, it is possible to arrange so that the display control section 1214*a* generates either the partial data or the adjacent document data in accordance with the positional relation, and transmits the partial data or the adjacent document data from the display apparatus 1200*a* to the display apparatus 1200*b* for display onto the display section 1210*b*.

The memory section 1216 records data to be displayed onto the display section 1210. In addition, the memory section 1216 provides a work area to be utilized by the display control section 1214 in controlling the display to the display section 1210. The memory section 1216 transmits and receives data to/from the communication section 1218, either via the display control section 1214 or directly.

The communication section 1218 communicates with the other display apparatus 1200. In addition, the communication section 1218 interfaces communication with devices in charge of control of the display apparatus 1200 such as a computer apparatus.

The power reception section 1220 receives power from the power feeder apparatus 1100. An example of power feeding by means of magnetic induction is a coil. Alternatively, an example of power feeding by means of electromagnetic wave is an antenna. Although it is preferable that power feeding to the power reception section 1220 is performed wirelessly, wired power feeding is also possible. Moreover, it is possible to perform power feeding by means of an electric battery or other types of batteries.

The display activation section 1222 generates a display activation signal indicating activation of display processing for the display data 1300. That is, the display activation section 1222 activates update of the display data 1300 on display by the display section 1210*a* by generating a display activation signal. Please note that this is an example in which the display activation section 1222 activates the update of the display data 1300 of the display section 1210*a*, but update of the display section 1210*b* may be activated too.

When the display activation section 1222 generates a display activation signal, the display activation signal is inputted to the position determination section 1212 and the display control section 1214, and the position determination section 1212 having received the display activation signal determines the positional relation at the time of display activation that is a positional relation between the display section 1210*a* and the display section 1210*b* at the time of receiving the display activation signal. Then the display control section 1214 having received the display activation signal displays partial data or adjacent document data of the partial data or the adjacent document data of the display data 1300 on display by the display section 1210b, to the display section 1210a.

A switch may be provided for detecting an operation of a user, as a trigger for generating the display activation signal. In this case, the display activation section 1222 generates a display activation signal by detecting an operation to the switch. Alternatively, it is possible to use the light detection sections 1232 as a trigger of generating the display activation signal. In this case, the display activation section 1222 may generate a display activation signal by detecting that the intensity of light detected by the light detection sections 1232 has been lowered to a predetermined value.

It is also possible to use a timer included in the display section 1210, as a trigger of generating a display activation signal. Specifically, the display section 1210 includes a timer section that is reset when the display section 1210 is placed to a predetermined place. The display activation section 1222 may generate a display activation signal by detecting that the count number in the timer section of the display section 1210a becomes smaller compared to the count number of the timer section of the display section 1210b.

Furthermore, it is possible to use a supply start of power from the power feeder apparatus 1100, as a trigger of generating a display activation signal. More specifically, the display activation section 1222 may generate a display activation signal by detecting supply start of power to the display section 1210a.

The data type determination section 1224 determines the type of the display data 1300. Accordingly, it is possible to perform display to the display section 1210b according to the type of the display data 1300. More specifically, the display control section 1214 displays partial data of the display data 1300 or adjacent document data adjacent to the display data 1300 to the display section 1210b, according to the type of data determined by the data type determination section 1224.

For example, when the type of the data determined by the data type determination section 1224 is a document type, the display control section 1214 causes the previous page or the subsequent page of the document page on display as the display data 1300, to be displayed to the display section 1210b, according to the positional relation determined by the position determination section 1212. Alternatively, when the type of the data determined by the data type determination section 1224 is an image type, the display control section 1214 changes the direction of the line of vision or the rotation angle of the stereoscopic image on display as the display data 1300, according to the positional relation determined by the position determination section 1212. Then the display control section 1214 displays the stereoscopic image of which the direction of the line of vision or the rotation angle has been changed, to the display section 1210b.

According to the display system 1000 described above, by performing placement by selecting from among several positional relations of the display apparatus 1200b with respect to the display apparatus 1200a, it is possible to display partial data or adjacent document data of the display data 1300 according to various types of modes according to the positional relations. In addition, by having the data type determination section 1224, it becomes possible to perform display in a mode suitable for the type of the display data 1300. Further, by having the display activation section 1222, new data is able to be displayed by causing, to be active again, the display apparatus 1200a displaying the display data 1300 in the display section 1210a. In this case, it is possible to more effectively make use of the present display system by displaying either partial data or adjacent document data of the data on display by the display section 1210b. Hereinafter, a display mode different according to the positional relation between the display section 1210a and the display section 1210b is described in detail.

Figure 12:
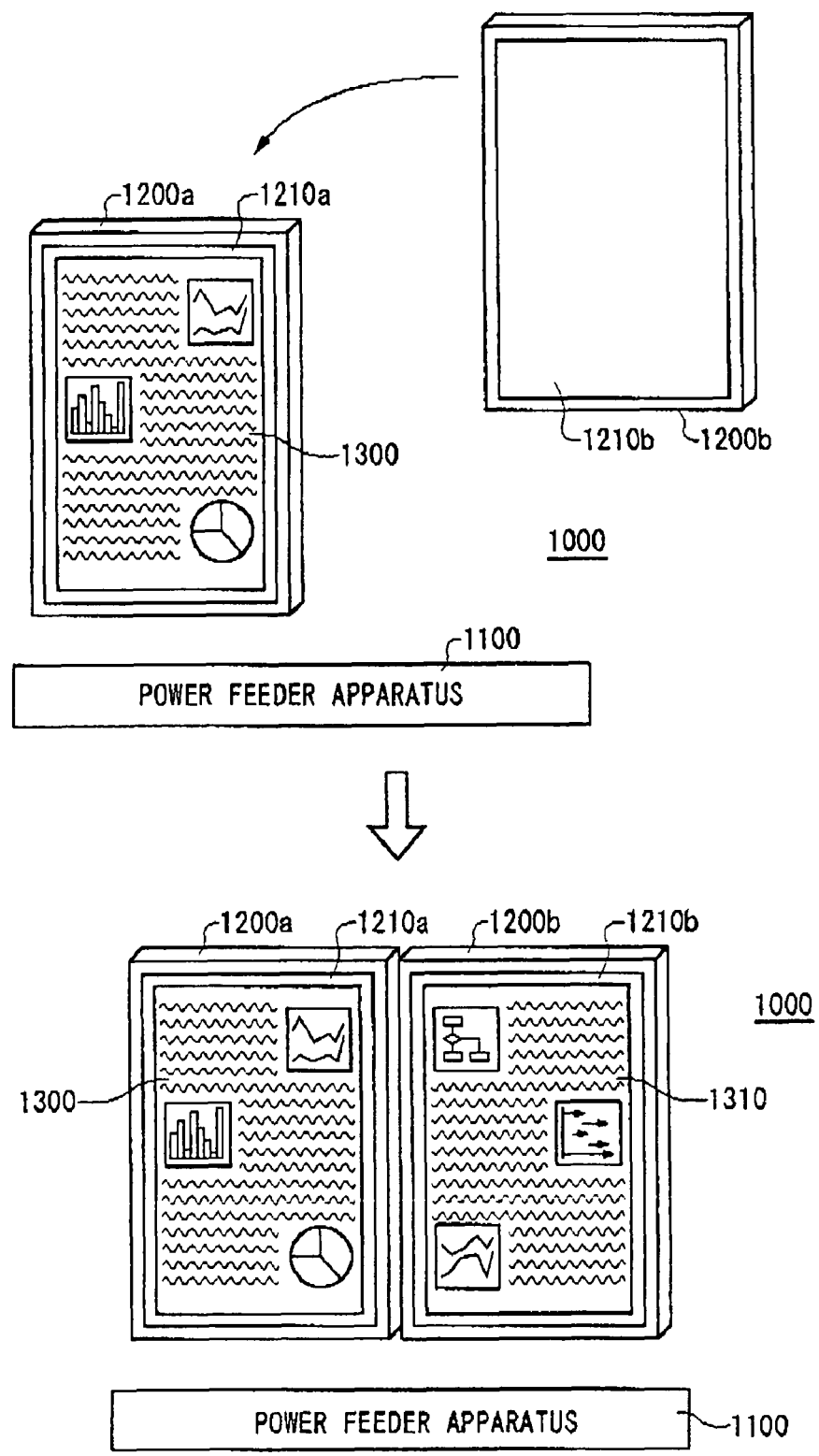
FIG. 12 shows an example of display in the display system 1000.

FIG. 12 shows an example of display in the display system 1000. The example of display shown here shows a display mode used for the display section 1210b when the display apparatus 1200a and the display apparatus 1200b are adjacent to each other (i.e. adjacent relation). In this drawing, the upper part corresponds to a case before the display apparatus 1200b is placed adjacent to the display apparatus 1200a, and the lower part corresponds to a case after the display apparatus 1200b is placed adjacent to the display apparatus 1200a.

Before placement of the display apparatus 1200b, the display section 1210a of the display apparatus 1200a is displaying the display data 1300. In this example, the display data 1300 is document data. Specifically the display data 1300 that corresponds to one page of document is displayed in the display section 1210a. On the other hand, nothing is displayed to the display section 1210b of the display apparatus 1200b at this moment.

Here, the display apparatus 1200b is placed adjacent to the display apparatus 1200a (the lower part of the same drawing). In response, the power reception section 1220b of the display apparatus 1200b receives power from the power feeder apparatus 1100, and each section in the display apparatus 1200b starts operating. The display activation section 1222 detects the power feeding start to the power reception section 1220b, and generates a display activation signal. The display activation signal is supplied to the position determination section 1212b and the display control section 1214b. In the position determination section 1212b, the positional relation between the display apparatus 1200a and the display apparatus 1200b is determined. Note that it is alternatively possible to transmit the display activation signal to the display apparatus 1200a, to determine the positional relation between the display apparatus 1200a and the display apparatus 1200b in the position determination section 1212a of the display apparatus 1200a.

Since the display apparatus 1200b is to be placed adjacent to the display apparatus 1200a in the present example, the positional relation between the display section 1210a and the display section 1210b determined by the position determination section 1212b is "adjacent relation". Information indicating that the positional relation is the adjacent relation is transmitted from the position determination section 1212b to the display control section 1214b as a positional relation code for example. Having acquired the positional relation, based on the information indicating the adjacent relation, the display control section 1214b displays to the display section 1210b the subsequent page 1310 being adjacent data adjacent to the display data 1300. Note that the data of the subsequent page 1310 can be acquired from the display apparatus 1200a via the communication section 1218b.

According to the display system 1000 of this example, it becomes possible to display to the display section 1210b the subsequent page being adjacent document data of the display data 1300 on display by the display section 1210a, based on the determination that the positional relation between the display section 1210a and the display section 1210b is the adjacent relation. As a result, the subsequent page can be displayed if a user only places the display apparatus 1200b adjacent to the display apparatus 1200a, which enhances the usability for the user. Note that although that the display apparatus 1200b is placed at the right side of the display apparatus 1200a in the present example, the display apparatus 1200b can alternatively be placed at the left side of the display apparatus 1200a. This is also considered as the adjacent relation. However since the position of the display apparatus 1200b relative to the display apparatus 1200a is different from the former case. In view of this positional difference, it is also possible to display the previous page of the display data 1300 in the display section 1210b of the display apparatus 1200b placed at the left side, for example.

In addition, the present example corresponds to a case where the adjacent document page is displayed to the display section 1210b according to the adjacent relation that indicates that the display section 1210b is placed adjacent to the display section 1210a. However, the present example can be also considered as corresponding to a case where the display section 1210b is placed in the same direction as the display section 1210a. Therefore, it is also possible to display the adjacent document page to the display section 1210b based on the same-directional relation indicating that the display sections 1210a and 1210b are placed in the same direction as each other.

Figure 13:
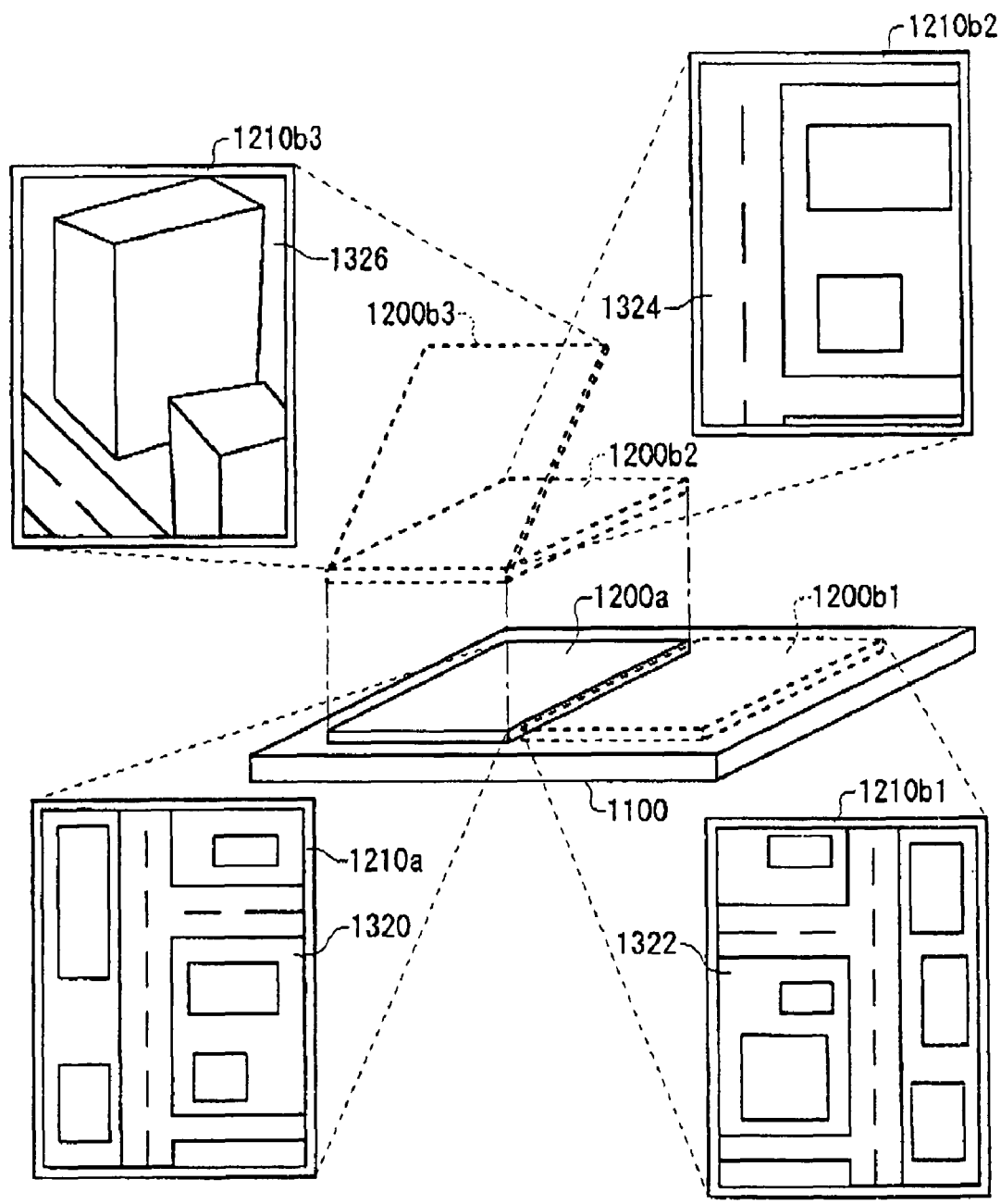
FIG. 13 shows a different example of display in the display system 1000.

FIG. 13 shows a different example of display in the display system 1000. The example of display shown here shows a display mode used for the display section 1210b when the display apparatus 1200a and the display apparatus 1200b are placed in the held-up relation. The display apparatus 1200a is placed above the power feeder apparatus 1100, and the display section 1210a of the display apparatus 1200a displays map data 1320 as display data. The display apparatus 1200b is placed in such a state.

By placing the display apparatus 1200b, the power reception may be performed from the power feeder apparatus 1100, and each section may start operating to cause the position determination section 1212b to determine the positional relation and the display control section 1214b to control display to the display section 1210b, and so on, as described in the former example. However note that the present example is different from the former example in that, in addition to being placed adjacent to the display apparatus 1200a, the display apparatus 1200b is also held above away from the display surface of the display apparatus 1200a ("held-up relation"), and further that the display apparatus 1200b is placed to be tilted with respect to the display apparatus 1200a in the held-up relation.

First when placing the display apparatus 1200b adjacent to the display apparatus 1200a (in this case, the display apparatus is represented as 1200b1, and the display section is represented as 1210b1), the position determination section 1212b determines that the positional relation between the display section 1210a and the display section 1210b is the adjacent relation. The display control section 1214b displays the map data 1322 being the adjacent data of the map data 1320 to the display section 1210b1, based on the determination that the positional relation is the adjacent relation. Note that the map data 1322 can be acquired from the display apparatus 1200a via the communication section 1218b.

Next, when holding up the display apparatus 1200b above away from the display surface of the display apparatus 1200a (in this case, the display apparatus is represented as 1200b2, and the display section is represented as 1210b2), the position determination section 1212b determines that the positional relation between the display section 1210a and the display section 1210b is the held-up relation. The display control section 1214b displays the enlarged view 1324 of the map data 1320 being the partial data of the map data 1320 to the display section 1210b2, based on the determination that the positional relation is the held-up relation. The enlargement factor of the enlarged view 1324 can be determined according to the distance between the display section 1210a and the display section 1210b. For example, when the distance is large, the enlargement factor may be set large, and when the distance is small, the enlargement factor may be set small. In addition, the enlargement factor may be set as below 1 (i.e. reduced size display). Note that the map data 1320 may be acquired from the display apparatus 1200a via the communication section 1218b, and the enlarged view 1324 may be appropriately calculated from the map data 1320.

Furthermore, in the held-up relation stated above, the display apparatus 1200b may be tilted with respect to the display apparatus 1200a (in this case, the display apparatus is represented as 1200b3, and the display section is represented as 1210b3). Then, the display to the display section 1210b is controllable depending on the angle of the tilting. This means that the position determination section 1212b may determine the angle formed between the plane to which the display section 1210a belongs and the plane to which the display section 1210b belongs, as a positional relation. Then the display control section 1214b changes the direction of the line of vision or the rotation angle in the case of displaying the enlarged view 1324 being partial data of the map data 1320 as a stereoscopic image according to the angle, and displays, to the display section 1210b3, a map image 1326 whose direction of the line of vision or rotation angle has been changed. Note that the map data 1320 can be acquired from the display apparatus 1200a via the communication section 1218b.

According to the display system 1000 of the present example, it is possible to display to the display section 1210b the map data 1320 on display by the display section 1210a, by either enlarging the map data 1320 or changing the direction of the line of vision or the rotation angle of the map data 1320, based on the determination that the positional relation between the display section 1210a and the display section 1210b is the held-up relation, or that the display section 1210b is tilted with respect to the display section 1210a in the held-up relation. As a consequence, a user is able to view the map image displayed as a stereoscopic image using an enlargement factor or in a direction of the line of vision that are appropriate, by simply holding up or tilting the display apparatus 1200b. Note that the present example takes an example of map data, however the display system of the present embodiment is applicable to a stereoscopic image.

Figure 14:
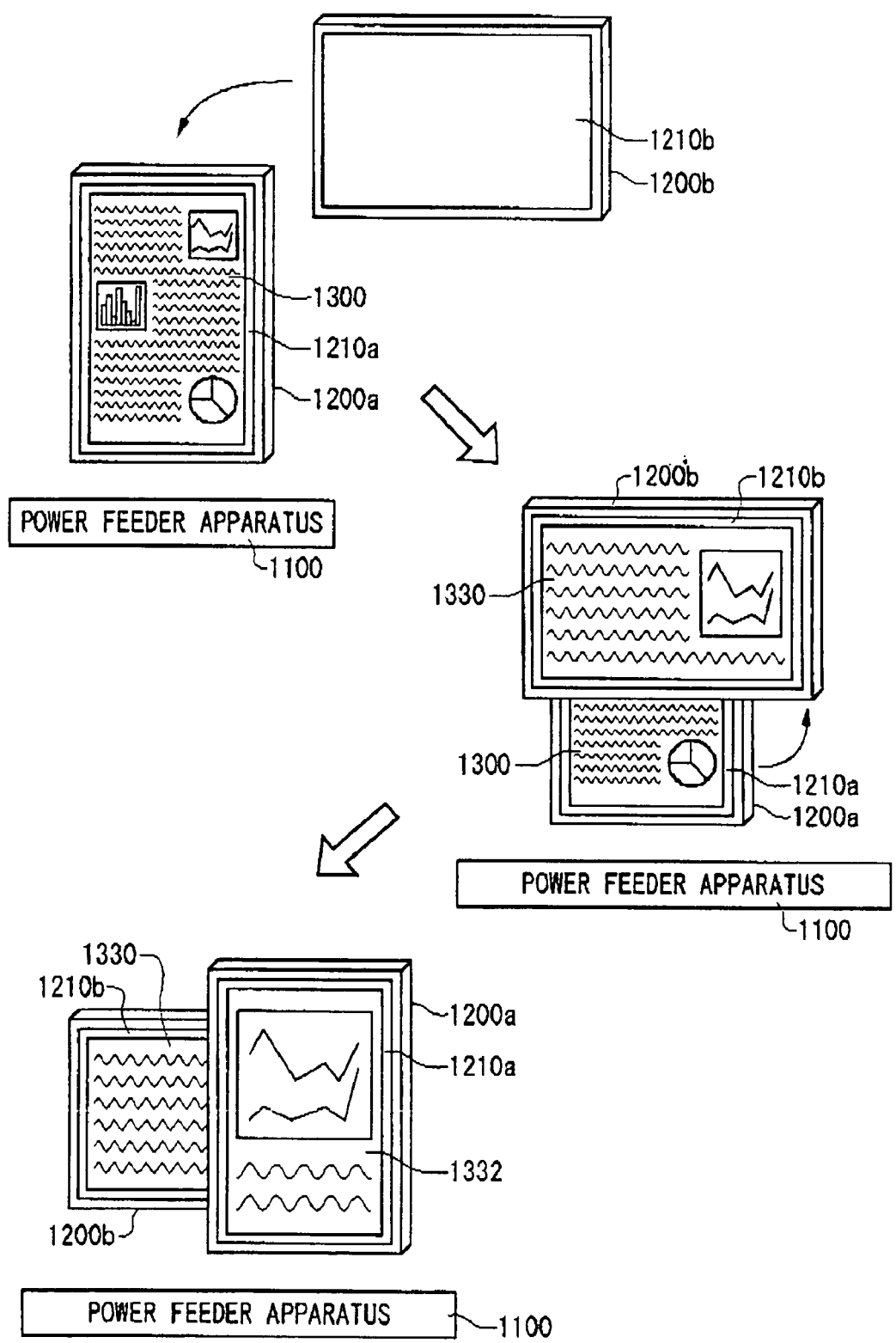
FIG. 14 shows a further different example of display in the display system 1000.

FIG. 14 shows a further different example of display in the display system 1000. The example of display shown here is a case where the display apparatus 1200a and the display apparatus 1200b are temporarily placed to perform display in respective display sections 1210, and are thereafter displayed again in the display section 1210a. The display apparatus 1200a is placed above the power feeder apparatus 1100, and the display data 1300 is on display by the display section 1210a of the display apparatus 1200a. On the other hand, nothing is on display by the display section 1210b of the display apparatus 1200b. The display apparatus 1200b is placed in such a state.

The display apparatus 1200b is placed either being overlapped to the display apparatus 1200a or in the different direction from the direction of the display apparatus 1200a. In other words, the positional relation between the display section 1210a and the display section 1210b is either an overlapping relation in which the display section 1210a and the display section 1210b overlap with each other or a different-directional relation in which the direction of the display section 1210a and the direction of the display section 1210b are different from each other. By placing the display apparatus 1200b, the power reception may be performed from the power feeder apparatus 1100, and each section may start operating to cause the position determination section 1212b to determine the positional relation and the display control section

1214*b* to control display to the display section 1210*b*, and so on, as described in the former example.

By placing the display apparatus 1200*b* in a different direction from the direction of the display apparatus 1200*a*, the position determination section 1212*b* determines that the positional relation between the display section 1210*a* and the display section 1210*b* is the different-directional relation. The display control section 1214*b* performs enlarged display of partial data 1330 of the display data 1300 to the display section 1210*b*1, based on the determination that the positional relation is the display apparatus 1200*a* via the communication section 1218*b*.

Next, the display apparatus 1200*a* is held up, and the display apparatus 1200*a* is overlapped to the display section 1210*b* of the display apparatus 1200*b*, or placed in a different direction from the direction of the display section 1210*b*, again. The display apparatus 1200*a* is cut off from power supply by being held up, and restarts receiving power supply by being placed again. At this time, the display apparatus 1200*a* generates a display activation signal by detecting restart of the power supply, to activate display processing. In other words, the display apparatus 1200*a* performs the same processing as a resetting operation. As a result, the position determination section 1212*a* of the display apparatus 1200*a* determines the positional relation between the display section 1210*b* and the display section 1210*a*. The display control section 1214*a* of the display apparatus 1200*a* performs enlarged display of partial data 1332 of the partial data 1330 to the display section 1210*a* of the display apparatus 1200*a*, based on the determination that the positional relation is the overlapping relation or the different-directional relation. Note that the partial data 1330 can be acquired from the display apparatus 1200*b* via the communication section 1218*a*.

According to the display system 1000 of the present example, it becomes possible to reset the display apparatus 1200*a* once displayed, to perform display again. At this time, it is possible to perform enlarged display of further partial data of the partial data 1330, by overlapping the further partial data to the partial data 1330 on display by the display section 1210*b* of the display apparatus 1200*b*, or by placing the further partial data in a different direction from the direction of the partial data 1330. By repeating such an operation, a user is able to view enlarged display data with ease.

Figure 15:
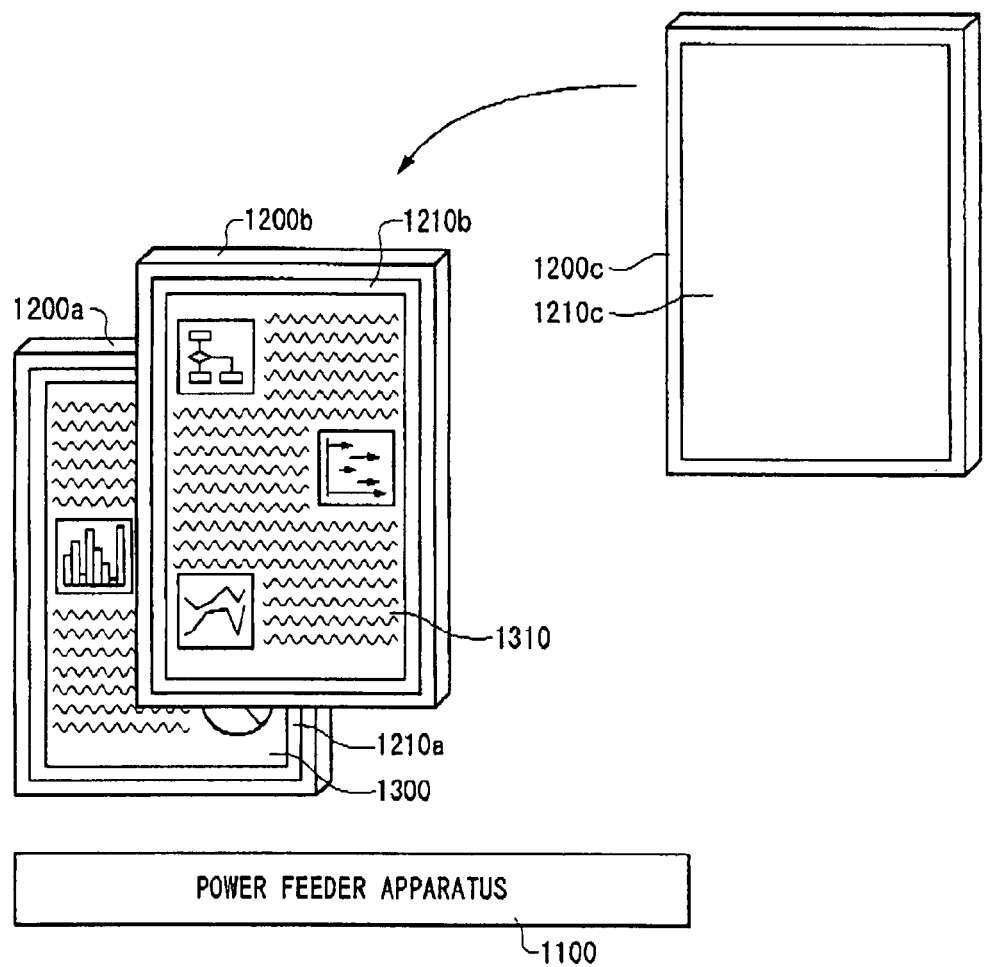
FIG. 15 shows a still different example of display in the display system 1000.

FIG. 15 shows a still different example of display in the display system 1000. The example of display shown here is a case where a display apparatus 1200*c* is placed in addition to the display apparatus 1200*a* and the display apparatus 1200*b*. The display data 1300 is displayed to the display section 1210*a* of the display apparatus 1200*a*, and the subsequent page 1310 being adjacent document data of the display data 1300 is displayed to the display section 1210*b* of the display apparatus 1200*b*. Here, the display apparatus 1200*c* where nothing is displayed to the display section 1210*c* is placed. Note that the configuration and function of the display apparatus 1200*c* may be the same as those of the display apparatus 1200*a* and so on.

Figure 16:
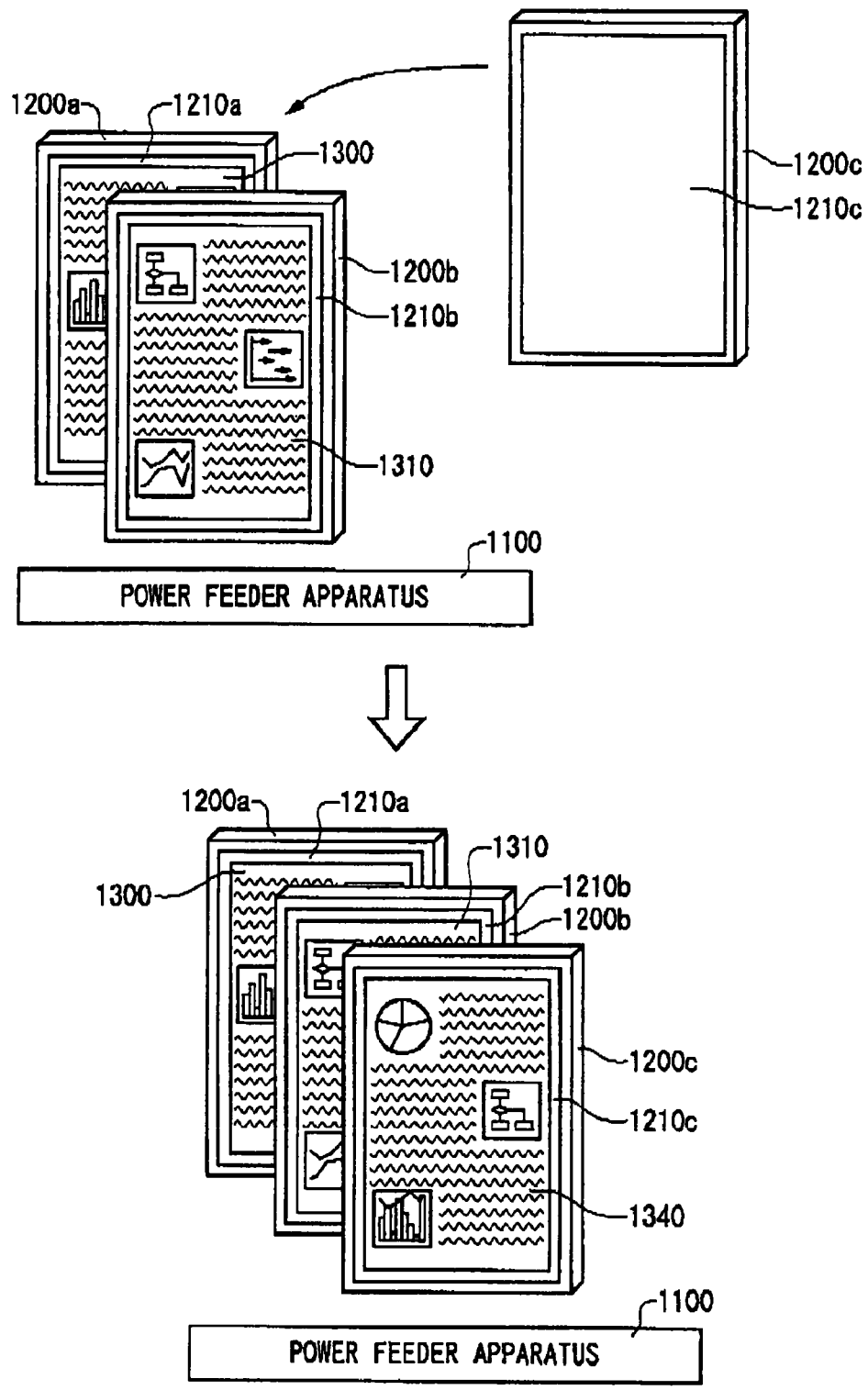
FIG. 16 shows an example of display in the display system 1000 of FIG. 15.

FIG. 16 shows an example of display in the display system 1000 of FIG. 15. The display apparatus 1200*b* is overlapped above the display apparatus 1200*a*. The display data 1300 is displayed by the display section 1210*a* of the display apparatus 1200*a*. As in the examples described above, the display apparatus 1200*b* operates, and the subsequent page 1310 being adjacent document data of the display data 1300 is displayed to the display section 1210*b* of the display apparatus 1200*b*.

Here, if the display apparatus 1200*c* is placed further above the display apparatus 1200*a* and the display apparatus 1200*b* in the same direction as the direction of the display apparatus 1200*a* and the display apparatus 1200*b*, the page-after-next 1340 being adjacent document data of the subsequent page 1310 is displayed to the display section 1210*c* of the display apparatus 1200*c*. In other words, the position determination section 1212*c* of the display apparatus 1200*c* determines that the positional relation among the display section 1210*a*, the display section 1210*b*, and the display section 1210*c* is the same-directional relation. According to this determination that the positional relation is the same-directional relation, the display control section 1214*c* of the display apparatus 1200*c* displays to the display section 1210*c* the page-after-next 1340 being adjacent document data of the subsequent page 1310. Note that this example corresponds to a case of displaying adjacent document data. However it is alternatively possible to display partial data of the display data 1300 to the display section 1210*b*, and to display still partial data of the partial data to the display section 1210*c*.

Figure 17:
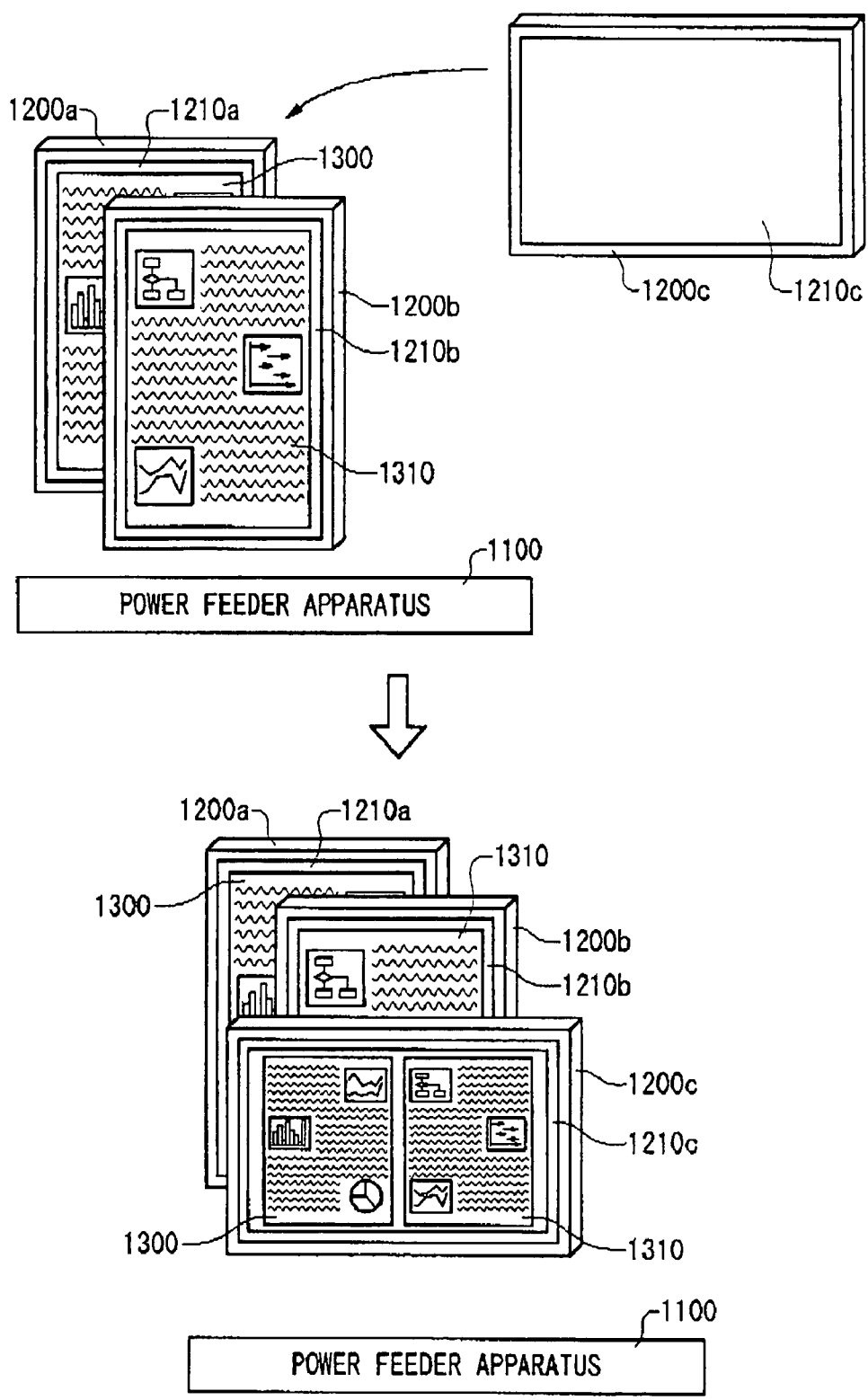
FIG. 17 shows a different example of display in the display system 1000 of FIG. 15.

FIG. 17 shows a different example of display in the display system 1000 of FIG. 15. The display apparatus 1200*b* is overlapped to the upper part of the display apparatus 1200*a*. The display data 1300 is displayed by the display section 1210*a* of the display apparatus 1200*a*. As in the examples described above, the display apparatus 1200*b* operates, and the subsequent page 1310 being adjacent document data of the display data 1300 is displayed to the display section 1210*b* of the display apparatus 1200*b*.

Here, if the display apparatus 1200*c* is placed in the different direction from the direction of the display apparatus 1200*a* and the display apparatus 1200*b* and further above the display apparatus 1200*a* and the display apparatus 1200*b*, the display data 1300 and the subsequent page 1310 being adjacent document data of the display data 1300 are displayed, in a reduced size, to the display section 1210*c* of the display apparatus 1200*c*. In other words, the position determination section 1212*c* of the display apparatus 1200*c* determines that the positional relation among the display section 1210*a*, the display section 1210*b*, and the display section 1210*c* is the different-directional relation. According to this determination that the positional relation is the different-directional relation, the display control section 1214*c* of the display apparatus 1200*c* displays to the display section 1210*c*, in a reduced size, the display data 1300 and the subsequent page 1310 being adjacent document data of the display data 1300. Note that this example corresponds to a case of displaying adjacent document data. However it is alternatively possible to display partial data of the display data 1300 to the display section 1210*b*, and to display the display data 1300 and partial data thereof, in a reduced size, to the display section 1210*c*.

Figure 18:
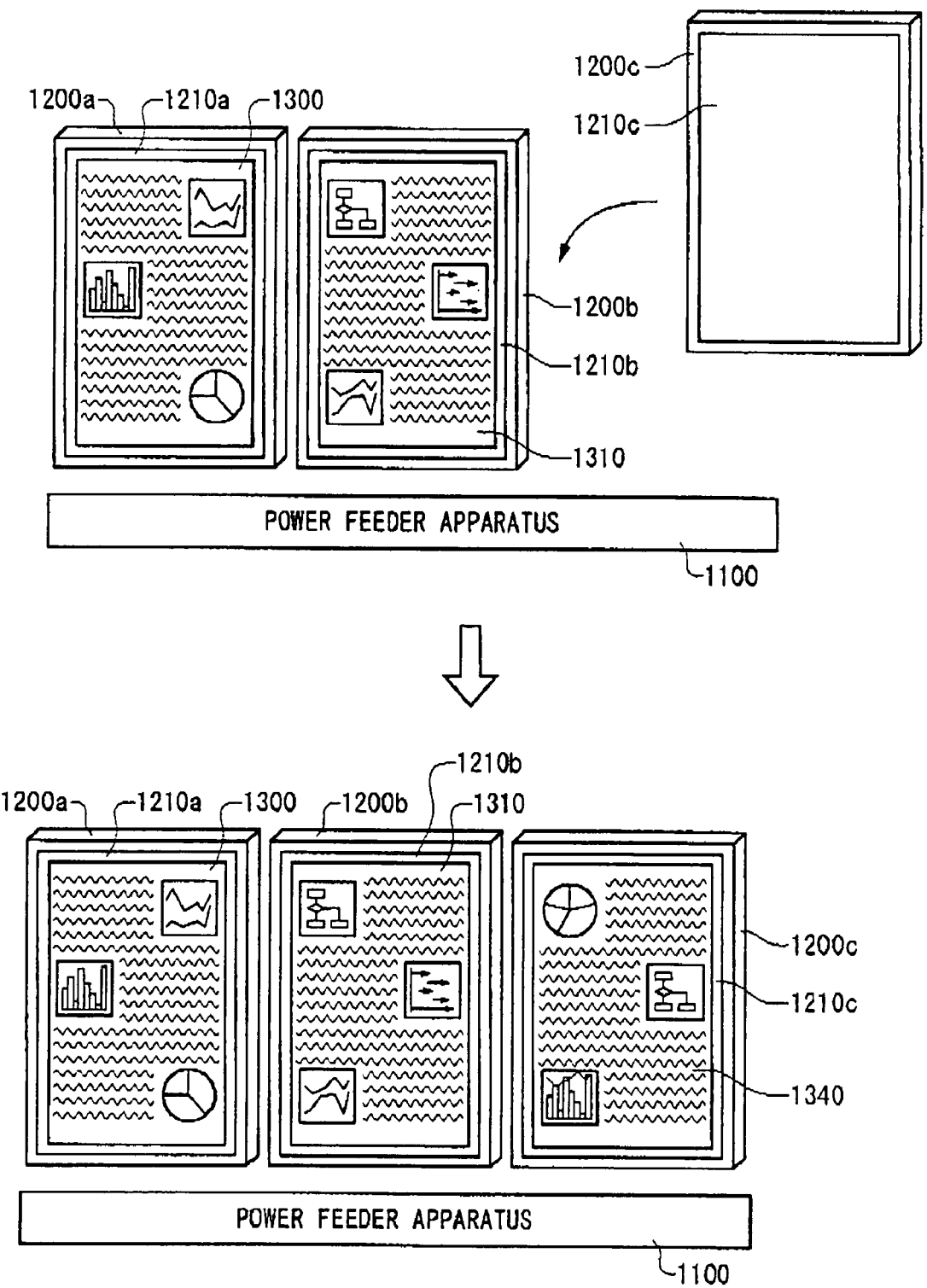
FIG. 18 shows a further different example of display in the display system 1000 of FIG. 15.

FIG. 18 shows a further different example of display in the display system 1000 of FIG. 15. The display apparatus 1200*b* is placed adjacent to the display apparatus 1200*a*. The display data 1300 is displayed by the display section 1210*a* of the display apparatus 1200*a*. As in the examples described above, the display apparatus 1200*b* operates, and the subsequent page 1310 being adjacent document data of the display data 1300 is displayed to the display section 1210*b* of the display apparatus 1200*b*.

Here, if the display apparatus 1200*c* is placed in the same direction as the direction of the display apparatus 1200*a* and the display apparatus 1200*b*, the page-after-next 1340 being adjacent document data of the subsequent page 1310 is displayed to the display section 1210*c* of the display apparatus 1200*c*. In other words, the position determination section 1212*c* of the display apparatus 1200*c* determines that the positional relation among the display section 1210a, the display section 1210b, and the display section 1210c is the same-directional relation. According to this determination that the positional relation is the same-directional relation, the display control section 1214c of the display apparatus 1200c displays, to the display section 1210c, the page-after-next 1340 being adjacent document data of the subsequent page 1310. Note that this example corresponds to a case of displaying adjacent document data. However it is alternatively possible to display partial data of the display data 1300 to the display section 1210b, and to display still partial data of the partial data to the display section 1210c.

Figure 19:
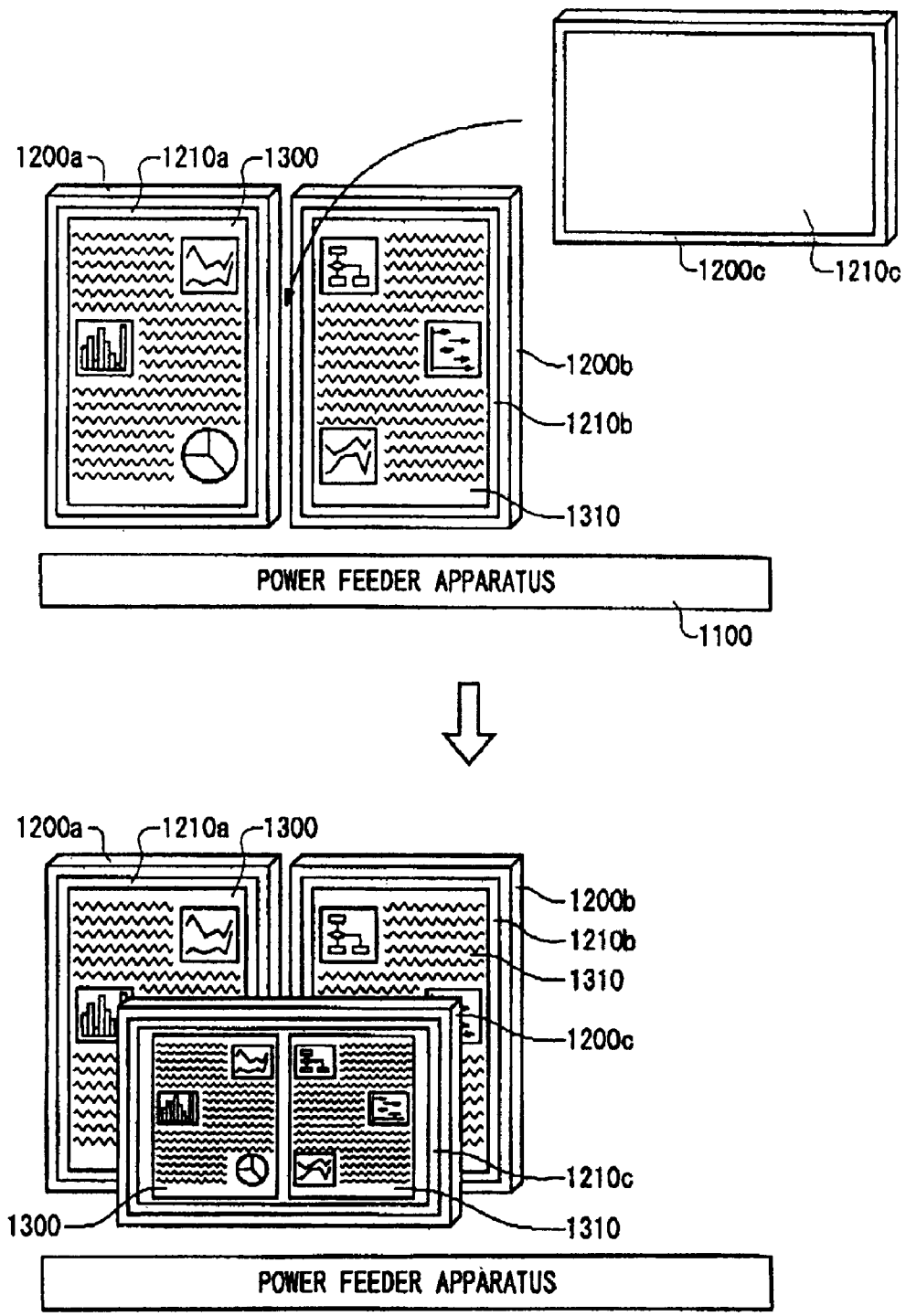
FIG. 19 shows a still further different example of display in the display system 1000 of FIG. 15.

FIG. 19 shows a still further different example of display in the display system 1000 of FIG. 15. The display apparatus 1200b is placed adjacent to the display apparatus 1200a. The display data 1300 is displayed by the display section 1210a of the display apparatus 1200a. As in the examples described above, the display apparatus 1200b operates, and the subsequent page 1310 being adjacent document data of the display data 1300 is displayed to the display section 1210b of the display apparatus 1200b.

Here, if the display apparatus 1200c is placed in the different direction from the direction of the display apparatus 1200a and the display apparatus 1200b and further above the display apparatus 1200a and the display apparatus 1200b, the display data 1300 and the subsequent page 1310 being adjacent document data of the display data 1300 are displayed, in a reduced size, to the display section 1210c of the display apparatus 1200c. In other words, the position determination section 1212c of the display apparatus 1200c determines that the positional relation among the display section 1210a, the display section 1210b, and the display section 1210c is the different-directional relation. According to this determination that the positional relation is the different-directional relation, the display control section 1214c of the display apparatus 1200c displays to the display section 1210c, in a reduced size, the display data 1300 and the subsequent page 1310 being adjacent document data of the display data 1300. Note that this example corresponds to a case of displaying adjacent document data. However it is alternatively possible to display partial data of the display data 1300 to the display section 1210b, and to display the display data 1300 and partial data thereof, in a reduced size, to the display section 1210c.

According to the display system 1000 shown by these examples, it is possible to display adjacent document data, or to perform reduced display of the document data or partial data thereof, according to addition of a new display apparatus 1200 to a plurality of display apparatuses 1200 displaying display data or the like in their display sections 1210. By adding a new display apparatus 1200, a user is able to sequentially display adjacent pages, or to perform reduced display of an already-displayed page to one display section 1210. The above examples correspond to a case of performing reduced display of the partial data 1300 and partial data, or to a case of reducing two pieces of data. However the present invention is not limited to such cases, and may display three or more pages in a reduced size, for example.

Figure 20:
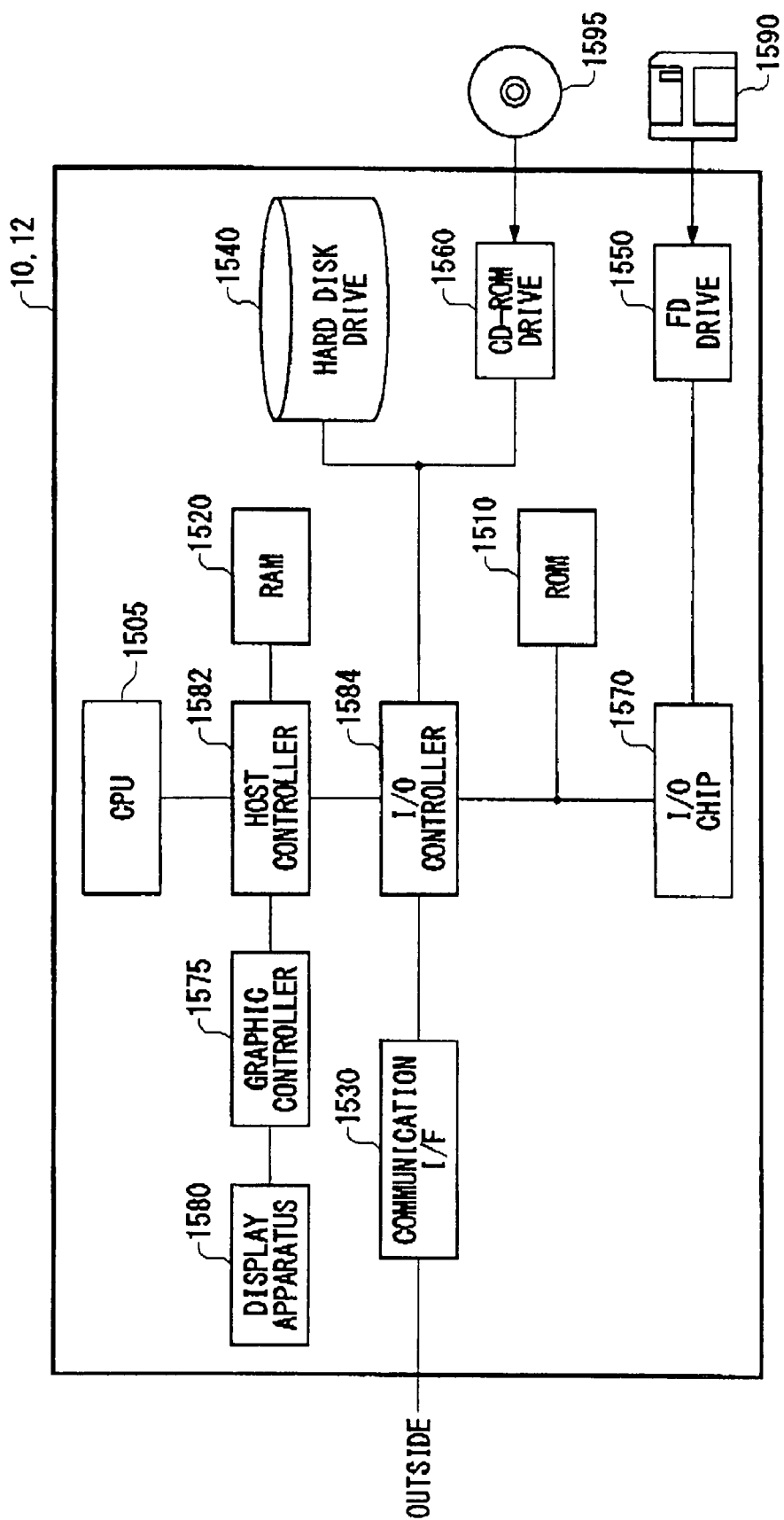
FIG. 20 is a block diagram showing a hardware configuration of the display system 10 and the display system 12.

FIG. 20 shows one example of a hardware configuration of the display system 10 and the display system 12 according to the present embodiment. The display system 10 and the display system 12 according to the present embodiment includes a CPU periphery having a CPU 1505, a RAM 1520, a graphic controller 1575 and a display device 1580 which are connected through a host controller 1582 each other, an input/output device having a communication interface 1530, a hard disk drive 1540 and a CD-ROM drive 1560 which are connected to the host controller 1582 through an input/output controller 1584 and a legacy input/output device having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 acquires image data generated on a frame buffer provided in the RAM 1520 by the CPU 1505 or the like and displays the same on the display 1580. Alternatively, the graphic controller 1575 may include therein a frame buffer for storing image data generated by the CPU 1505 or the like.

The input/output controller 1584 connects the host controller 1582 to the communication interface 1530, the hard disk drive 1540 and the CD-ROM drive 1560 which are relatively high-speed input/output devices. The communication interface 1530 communicates with the other device through a network. The hard disk drive 1540 stores the program and data used by the CPU 1505 in the display system 10 and the display system 12. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output devices are connected to the input/output controller 1584. The ROM 1510 stores a boot program executed by the display system 10 and the display system 12 at activating the display system 10 and the display system 12 and a program depending on the hardware of the display system 10 and the display system 12. The flexible disk drive 1550 reads the programs or data from a flexible disk 1590 and provides the same to the hard disk drive 1540 through the RAM 1520. The input/output chip 1570 connects various input/output devices through the flexible disk drive 1550 such as a parallel port, a serial port, a keyboard port and a mouse port.

A display program provided to the hard disk drive 1540 through the RAM 1520 is in a recording medium, such as the flexible disk 1590, the CD-ROM 1595, an IC card or the like, and provided by the user. The display program is read from the recording medium, installed into the hard disk drive 1540 in the display system 10 and the display system 12 through the RAM 1520 and executed by the CPU 1505. The display program executed by being installed in the display system 10 and the display system 12 acts on the CPU 1505 or the like, to cause the display system 10 and the display system 12 to function as the first display section 200, the first display control section 210, the first communication section 220, the first storage unit 230, the data storage section 232, the display partial area storage section 234, the first power feeder section 240, the relative position determination section 250, the light quantity detection section 260, the plurality of light sensors 262, the plurality of signal reception sections 270, the signal strength calculation section 280, the second display section 300, the second display control section 310, the second communication section 320, the second storage unit 330, the second power feeder section 340, the plurality of signal transmission sections 370, the third display control section 410, the third communication section 420, the position identifying section 430, the data acquiring section 440, the editing instruction acquiring section 470, the information input section 472, the data storage section 490, the first display section 500, the first display control section 510, the first communication section 520, the first storage unit 530, the second display section 600, the second display control section 610, the second communication section 620, and the second storage unit 630, described in the drawings from FIG. 1 to FIG. 9.

In the above, the present invention has been described by way of exemplary embodiments. However, it is needless to say that the technical scope of the present invention should not be limited by the above-described embodiments. It should be understood that those skilled in the art might make various types of modifications and substitutions to the above-described embodiments without departing from the spirit and the scope of the present invention. It is obvious from the appended claims that embodiments with such modifications or substitutions also belong to the technical scope of the present invention.

What is claimed is:

1. A display system comprising:
   a first display section that displays display data;
   a second display section that displays partial data of the display data or adjacent document data adjacent to the display data;
   a position determination section that determines a positional relation between the first display section and the second display section; and
   a display control section that causes the partial data and the adjacent document data to be selectively displayed to the second display section, according to the positional relation determined by the position determination section, and wherein
   when the positional relation determined by the position determination section is an overlapping relation which indicates that the second display section is overlapped to the first display section, the display control section performs enlarged display of the partial data to the second display section, and
   when the first display section is in a positional relation with respect to the second display section, and the first display section is overlapped to the second display section again, the display control section performs enlarged display of a partial data of the enlarged partial data to the first display section.

2. The display system as set forth in claim 1, wherein the partial data of which enlarged display is performed to the second display section is part of the display data that is displayed in an area of the first display section to which the second display section is overlapped.

3. The display system as set forth in claim 2, wherein when the second display section is moved by being overlapped to the first display section from a position corresponding to an upper edge of the display data to a position corresponding to a lower edge of the display data, the display control section causes the display data to be displayed to the second display section by sequentially enlarging the display data from the upper edge to the lower edge.

4. The display system as set forth in claim 1, further comprising:
   a plurality of signal transmission sections that respectively transmit an identification signal that identifies from which position of which display section a signal comes from, by being placed in one or both of the first display section and the second display section; and
   a plurality of signal reception sections that receive each identification signal transmitted from the plurality of signal transmission sections, by being placed in the other or both of the first display section and the second display section, wherein
   the position determination section specifies positions of the signal transmission sections that have transmitted the identification signals, from positions of the plurality of signal reception sections in the first display section or the second display section and from strengths of the identification signals received by the signal reception sections in the positions of the plurality of signal reception sections, and using, as a reference, the other or both of the first display section and the second display section in which the plurality of signal reception sections are displayed, and
   determines a positional relation between the first display section and the second display section, from the specified positions of the signal transmission sections and the positions of the signal transmission sections in the first display section or the second display section.

5. The display system as set forth in claim 1, further comprising:
   a plurality of light detection sections placed either in the first display section or the second display section, wherein
   the position determination section determines the positional relation between the first display section and the second display section from positions of the plurality of light detection sections in the first display section or the second display section, and intensities of light detected by each of the plurality of light detection sections.

6. The display system as set forth in claim 1, further comprising:
   a position identifying section that identifies positions of the first display section and the second display section, wherein
   the position determination section determines the positional relation between the first display section and the second display section, from the positions of the first display section and the second display section identified by the position identifying section.

* * * * *